United States Patent
Arsenault et al.

(10) Patent No.: US 10,076,923 B2
(45) Date of Patent: Sep. 18, 2018

(54) THERMOCHROMIC MATERIAL

(71) Applicant: OPALUX INCORPORATED, Toronto (CA)

(72) Inventors: Andre Arsenault, Toronto (CA); Romain Perrier-Cornet, Toronto (CA)

(73) Assignee: OPALUX INCORPORATED, Toronto (CA)

( * ) Notice: Subject to any disclaimer, the term of this patent is extended or adjusted under 35 U.S.C. 154(b) by 145 days.

(21) Appl. No.: 15/113,874

(22) PCT Filed: Jan. 29, 2015

(86) PCT No.: PCT/CA2015/000052
§ 371 (c)(1),
(2) Date: Jul. 25, 2016

(87) PCT Pub. No.: WO2015/113143
PCT Pub. Date: Aug. 6, 2015

(65) Prior Publication Data
US 2017/0028763 A1    Feb. 2, 2017

Related U.S. Application Data

(60) Provisional application No. 61/933,036, filed on Jan. 20, 2014.

(51) Int. Cl.
*B42D 25/378* (2014.01)
*B32B 3/26* (2006.01)
(Continued)

(52) U.S. Cl.
CPC .............. *B42D 25/378* (2014.10); *B32B 3/26* (2013.01); *B32B 5/16* (2013.01); *B42D 25/21* (2014.10);
(Continued)

(58) Field of Classification Search
CPC .... G02F 1/0147; G02F 1/13718; G02F 1/167; G02F 2202/32; G02F 2203/48;
(Continued)

(56) References Cited

U.S. PATENT DOCUMENTS 3,367,393 A * 2/1968 Lenahan ................. B22C 1/165
164/34
7,631,252 B2 * 12/2009 Hertzfeld ................ G06T 11/60
382/254

(Continued)

FOREIGN PATENT DOCUMENTS

WO    WO 2013164255    11/2013

OTHER PUBLICATIONS

Hu et al., *Journals of Materials Chemistry C* 2:3695-3702, 2014.
(Continued)

*Primary Examiner* — Loha Ben
(74) *Attorney, Agent, or Firm* — Norton Rose Fulbright US LLP

(57) ABSTRACT

A print on-demand color shift material which has high reflection, high saturation color and intrinsic, high impact color-shift produced by thermal printing or laser writing for use, for example in security laminates, tax and excise stamps, machine-readable features and banknote foils, and offering a rainbow of colors with full color shifting, producible in full manufacturing scale.

30 Claims, 28 Drawing Sheets

(51) Int. Cl.
- *B32B 5/16* (2006.01)
- *B42D 25/21* (2014.01)
- *B42D 25/41* (2014.01)
- *B42D 25/355* (2014.01)
- *G02F 1/01* (2006.01)
- *B42D 25/36* (2014.01)
- *B82Y 20/00* (2011.01)
- *B32B 37/24* (2006.01)

(52) U.S. Cl.
CPC ........... *B42D 25/355* (2014.10); *B42D 25/36* (2014.10); *B42D 25/41* (2014.10); *G02F 1/0147* (2013.01); *B32B 2037/243* (2013.01); *B32B 2037/246* (2013.01); *B32B 2310/0806* (2013.01); *B32B 2425/00* (2013.01); *B32B 2519/00* (2013.01); *B32B 2551/00* (2013.01); *B32B 2554/00* (2013.01); *B82Y 20/00* (2013.01); *G02F 2202/32* (2013.01)

(58) Field of Classification Search
CPC ...... B82Y 20/00; B42D 25/21; B42D 25/351; B42D 25/355; B42D 25/36; B42D 25/369; B42D 25/378; B42D 25/45; H01G 9/0029; H01G 9/209; H01G 2009/001; B32B 3/26; B32B 5/16; B32B 5/24; B32B 2037/243; B32B 2037/246; B32B 2310/0806; B32B 2425/00; B32B 2519/00; B32B 2551/00; B32B 2554/00
USPC ...... 359/288, 455, 593; 345/41, 60, 64, 106; 349/16, 20, 113; 283/85; 385/129, 131
See application file for complete search history.

(56) References Cited

U.S. PATENT DOCUMENTS

| | | | |
|---|---|---|---|
| 8,039,065 B2* | 10/2011 | Ikeda | G02B 1/111 349/137 |
| 9,541,701 B2* | 1/2017 | Thompson | G02B 6/005 |
| 2010/0150511 A1 | 6/2010 | Arsenault et al. | 385/130 |
| 2012/0080878 A1 | 4/2012 | Kecht et al. | 283/85 |
| 2016/0258114 A1* | 9/2016 | Firth | B82Y 20/00 |
| 2016/0319588 A1* | 11/2016 | Samanta | B32B 17/068 |

OTHER PUBLICATIONS

Khoo et al., *IEEE Journal of Selected Topics in Quantum Electronics* 16(2):410-417, 2010.

Written Opinion and Search Report for PCT/CA2015/000052, dated May 4, 2015.

* cited by examiner (a)            (b)

(a)

(b)

(c)

(a)

(b)

90°  30°

(a)

90°  30°

(b)

(a)

(b)

(c)

(d)

THERMOCHROMIC MATERIAL

CROSS-REFERENCE TO RELATED APPLICATIONS

This application is a national phase application under 35 U.S.C. § 371 of International Application No. PCT/CA2015/000052 filed 29 Jan. 2015, which claims priority to U.S. Provisional Application No. 61/933,036 filed 29 Jan. 2014. The contents of each of the above-referenced applications are incorporated into the present application by reference.

FIELD

This description relates to optical devices comprising tunable photonic crystals, the devices having an alternating layer structure, one layer comprising a thermally responsive material which responds to an external thermal stimulus. The devices offer print on demand color shift material which has high reflection, high saturation color and intrinsic, high impact color-shift produced by thermal printing or laser writing for use, for example in security laminates, tax and excise stamps, machine-readable features, banknote foils, consumer product branding and brand product protection, and offering a rainbow of colors with full color shifting, producible in full manufacturing scale.

BACKGROUND

A multilayer optical film (MOF) comprises multiple layers of two or more materials, where these layers have differing indices of refraction. Such multilayer optical films can result in reflections of given bands of wavelengths, and are well known in theory and in practice, see for example U.S. Pat. No. 3,711,176 (Alfrey et al.), U.S. Pat. No. 4,162,343 (Wilcox, F. S. et al.), (Radford, J. A., Alfrey, T., Schrenk, W. J.; Reflectivity of iridescent coextruded multilayered plastic films; Polymer engineering and science, May, 1973, Vol. 13, No. 3, p. 216), (Macleod, H. A.; Thin-film optical filters, $3^{rd}$ edition, Institute of Physics Publishing, 641 p.), and (Willey, R. R., Practical design and production of optical thin films, $2^{nd}$ edition, Marcel Dekker, 2002, 547 pages). MOFs are widely used in applications that include tunable lasers, filters, waveguides, fiber-optics, optics and telecommunications, filters for fiber-optics communications, security devices and pigments, decorative coatings and films, among others.

MOFs may also be known as optical multilayers, Bragg stacks, distributed Bragg reflectors, Bragg gratings, or 1-dimensional photonic crystals. MOFs may be prepared in a number of ways, including coextrusion, physical vapor deposition (including sputtering and evaporation), chemical vapor deposition, dip-coating, liquid coatings, amongst others (see Ullmann's Encyclopedia of Industrial Chemistry—Thin Films, Vol. 36, pp. 519-587). They are used widely in the fields of optics and telecommunication, lasers, filters, waveguides, fiber-optics, security devices and pigments, decorative coatings and films, amongst others.

The following patent publications are referenced here as they relate to photonic crystals: PCT/CA2007/000236; PCT/CA2009/000273; PCT/CA2009/000745; PCT/CA2009/001052; CA2009/001170; PCT/CA2009/001672; PCT/CA2010/000293; PCT/CA2010/001604; PCT/CA2011/001254; PCTCA2011/001363; PCT/CA2012/000077; and PCT/CA 012/000517. The disclosures of these references are incorporated herein by reference in their entirety.

MOFs may be constructed from layers of two or more materials, most often layered on top of each other in a periodic arrangement. If the two or more materials have a difference in refractive index, light may be partially reflected at each boundary, and upon re-exiting the material the light waves might at least partially interfere with each other. If the light waves constructively interfere, these particular wavelengths will be reflected from the material in a mirror-like configuration. Destructive interference, on the other hand, results in light being transmitted through the material. Partial interference would cause effects intermediate these two cases. A MOF typically comprises periodically alternating layers of a relatively high refractive index material and a relatively low refractive index material. As incident light impinges on the MOF, a series of scattering events ensue whereby only a narrow band of wavelengths, typically centered about one single wavelength, λ, are coherently diffracted and reflect off the surface of the material. The normal incidence first-order central wavelength, $\lambda_f$, may be predicted by the Bragg equation (Wu et al., Small 2007, vol. 3 p. 1445):

$$\lambda_f = 2(n_1 d_1 + n_2 d_2) \qquad \text{(equation 1)}$$

where n is the refractive index, and d is the geometric thickness of each layer 1 and 2.

Therefore, the reflection properties of a particular MOF depend primarily on the optical thickness of each layer, where the optical thickness is the refractive index multiplied by the geometric thickness (nd). The reflection of a MOF can be designed to fall in the UV, visible, or infrared regions by correctly choosing the optical thickness of the constituent layers. Furthermore, if the optical thickness of one or more layers can be changed in a controlled manner, the reflected color may also be changed in a controlled manner (see US Patent application 2011/0164308 A1, Arsenault A. C. et al.).

It should be noted that this equation governs the reflection of a particular band of wavelengths, which can be used advantageously in some applications. While a given band of wavelengths is reflected, the remainder of the wavelengths are allowed to pass through the material relatively unimpeded, depending on the scattering/absorption properties of the material. Therefore, such a material may be viewed in reflection which results in a particular color perception. Such a material may also be viewed in transmission, which would give a complimentary color to the reflected color. For example, a material reflecting green light would give a magenta color in transmission, whereas a material reflecting blue light would give a yellow color in transmission.

The intensity of the reflectance band at λ in air is given by the following expression (see (Macleod, H. A.; Thin-film optical filters, 3rd edition, Institute of Physics Publishing, 641 p.)):

$$R = [(1-Y)/(1+Y)]^2 \times 100(\%) \qquad \text{(equation 2)}$$

$$Y = (n_2/n_1)^{N-1}(n_2^2/n_s) \qquad \text{(equation 3)}$$

where $n_2$, $n_1$, and $n_s$ are the refractive indices of the high-index material, the low-index material, and a substrate, respectively, and N is the number of layers in the MOF. As can be seen, the reflectance, R, increases with increasing values of the refractive-index contrast ratio, $n_2/n_1$, as well as with the number of layers in the stack (N).

The breadth of the first-order reflection peak may also be approximated using the following equation:

$$\Delta g = (2/\pi)\sin^{-1}((n_H - n_L)/(n_H + n_L)) \qquad \text{(equation 4)}$$

where Δg represents the ratio of half the peak width to the peak central wavelength, and $n_H$ and $n_L$ represent the refractive indices of the high and low refractive index layers, respectively. As can be seen, the greater the refractive index contrast, the greater will be the reflected peak width.

A MOF may also display higher-order reflections in different regions of the light spectrum than the first-order reflection. (See Radford, J. A. et al.). The wavelength of higher-order reflections can be approximated by the following:

$$\lambda_X = (2/X)(n_1 d_1 + n_2 d_2) \qquad \text{(equation 5)}$$

where X is an integer value, and $\lambda_X$ is the $X^{th}$ order of reflection.

For example, if a MOF is designed to have a first-order reflection peak at 1000 nm, it may also have higher-order reflection peaks at 500 nm (1000/2), 333 nm (1000/3), 250 nm (1000/4), and so on. One or more of these higher-order reflection peaks may be in the visible range, and would be perceived by an observer as a color reflection. If the visible region contains more than one reflection peak, the user may perceive a color which is a color mixture.

The relative intensities of the various orders of reflection is strongly dependent on the ratio of optical thicknesses (f-ratio) (see equation 3, and FIG. 2, Radford, J. A. et al.), given by:

$$f = (n_1 d_1)/(n_1 d_1 + n_2 d_2) \qquad \text{(equation 6)}$$

In the case of the first-order peak, the maximum reflection intensity is maximal at a f-ratio of 0.5, where the optical thicknesses of both layers are equal, and where both thicknesses correspond to a quarter-wavelength of the wavelength of maximum reflection intensity. The reflection of the first-order peak can remain relatively high, even for f-ratios down to 0.25 and below. The higher-order reflection, however, show a more marked dependence on the f-ratio. For example, the second-order reflection is suppressed at f=0.5, but maximal at f=0.25, the third-order reflection is maximal at f=0.167 and f=0.5, but suppressed at f=0.33, and the fourth-order reflection is maximal at f=0.125 and f=0.375, and suppressed at f=0.25 and f=0.5.

The intensity and width of higher-order reflections in a MOF are also related to the refractive index contrast, as for the first-order reflection (equations 2-4), for a given f-ratio.

While with the described MOFs have included alternating layers and periodically repeating layers, many other configurations are possible. Layers could be single or multiple in number, can vary in thickness in a variety of ways (homogenous gradient, periodic or semi-periodic arrangements, aperiodic arrangements, and superstructures), can comprise two or more compositions with two or more refractive indices, and can have different layers arranged above, below, or within the MOF to tune the optical properties. The variety of possible optical structures and their uses are well known, as described in (Macleod, H. A.; *Thin-film optical filters*, 3rd edition, Institute of Physics Publishing, 641 p.).

The positions of maximal reflection intensity for both the first-order and higher-order reflection peaks from a MOF show a dependence on the angle of the incident light. Equations 1 and 5 as noted above correspond to the wavelength reflected by light impinging normal to the multilayer surface (perpendicular to the layer direction). As the angle of incident light deviates from the perpendicular direction, the reflected wavelengths will blue-shift, or shift to lower wavelengths, a known property of such materials. (see Pfaff G., Reynders, P., Angle-dependent optical effects deriving from submicron structures of films and pigments, Chemical Reviews, 1999, 99, 1963-1981; Macleod, H. A.; Thin-film optical filters, 3rd edition, Institute of Physics Publishing, 641 p.)).

As can be seen from equations 1-6, the optical properties (including but not limited to the position, breadth, intensity and angle-dependence of both first-order and higher-order reflection peaks) of MOFs are heavily dependent on the refractive index and geometric thickness of the layers of the MOF. Consequently, MOFs that change optical properties in response to a thermal input (i.e., thermally tunable MOFs) may be created if the refractive index and geometric thickness of the layers of the MOF change in response to a thermal input.

Importantly, and as also demonstrated by equations 1-6, the greater the potential change in the refractive index and geometric thickness of the layers of the MOF, the greater the potential change in the MOF's optical properties. A larger potential change in the MOF's optical properties (i.e., a greater tunability) is desirable, because it allows a single MOF to provide a wider range of appearances, thereby enhancing the MOF's suitability for applications like security laminates, tax and excise stamps, machine-readable features, banknote foils, consumer product branding and brand product protection, and other printing and customization applications.

While the prior art provides some means to create tunable MOFs (see for example, WO 2009/143625, the entirety of which is incorporated herein by reference), there remains a need for MOF materials showing superior thermal tuning properties. Specifically, there is a need for a material whose reflected color can be broadly and irreversibly shifted in order to provide a permanent indication of instantaneous or cumulative heat load. There is also a need for such materials to have a continuous tuning range, such that multiple color states, corresponding to multiple conditions of time/temperature, may be generated.

There also exists the need for bright, thermally responsive materials with wide color tuning range in the fields of imaging and printing, specifically using direct thermal printers or laser writing/marking equipment.

Finally, there exists a need for improved color-shifting films and pigments and processes for tuning their colors. The color-shifting properties of MOFs make them candidates for color-shifting films and pigments, which are used widely in currency, ID documents, and as security features in other products. Color-shift is also used in a variety of non-security uses for aesthetic and eye-catching effects. Some color-shifting pigments can be printed by screen printing, which may increase the security of the color-shift effects. However, screen-printing cannot provide printing on-demand of arbitrary graphics or patterns. In the same way, more than one color of color-shift pigment may be printed in separate steps on the same substrate using screen printing, but high alignment accuracy between the printing steps is necessary. It would be highly beneficial to have a method to easily pattern color-shift materials on-demand in arbitrary patterns, and in multiple colors, using a single patterning step. It would be further beneficial to achieve this while not requiring consumables or multiple inks.

Past thermally tunable MOFs have had complicated manufacturing requirements. For example, the thermal tunability of the MOFs disclosed in WO 2012/162805 (referred to in that reference as Bragg Stacks) arises from a collapse in the porosity of its constituent layers. These porous layers are created by providing a layer comprising a polymer-particle composite, and subsequently etching away the particle with a chemical etchant.

SUMMARY

The use of fluidizable particles to fabricate layers of a MOF is disclosed herein. As will be described subsequently, the geometric packing of the fluidizable particles results in interstitial void space, without needing to provide particles to be etched away. This is a significant improvement from a manufacturing perspective. The particles may be selected from microparticles and nanoparticles and combinations thereof.

Described herein is a thermally tunable multilayer optical film in which at least one layer is comprised of fluidizable particles with interstitial void space between the particles. Upon application of a thermal stimulus, the geometric thickness and/or refractive index of that at least one layer changes. Additionally, upon application of a thermal stimulus, the geometric thickness and/or refractive index of other layers of the MOF may also change. These changes in geometric thickness and refractive index result in a change in optical properties of the MOF.

In one form of this disclosure, there is provided a tunable multilayer optical film having at least two layers, at least one layer comprising a plurality of fluidizable particles, there being interstitial void space between the particles, the at least one layer comprising a plurality of fluidizable particles, and the layer having a first refractive index and a first optical thickness, the second layer having a second refractive index and a second optical thickness, the first refractive index being different from the second refractive index.

The fluidizable particles can comprise a core-shell configuration.

Coating components can occupy at least a portion of the interstitial void space.

The multilayer optical film has an initial set of optical properties, and upon the application of energy, the multilayer optical film's optical properties can change to a second set of optical properties. The energy can be provided in the form of thermal or radiant energy.

The initial set of optical properties of the tunable multilayer optical film differ from the second set of optical properties in at least one of the properties: optical thickness and geometric thickness.

In some forms, the interstitial void space is at least partially eliminated when the tunable multilayer optical film is subjected to the application of energy. The fluidizable particles may at least partially fuse together or consolidate. Further, upon the application of energy, a fluid is formed from the fluidizable particles, which infiltrates a layer other than the layer comprising those fluidizable particles. Alternatively, the tunable multilayer optical film can be fixed so that it is no longer tunable.

In another form, the tunable multilayer optical film can comprise alternating layers.

In yet another form of the tunable multilayer optical film, the fluidizable particles are selected from the group of salts, organic or inorganic molecular compounds, polymers, ionomers, crystals and other compounds capable of becoming fluid at a transition temperature.

In other forms, the tunable multilayer optical film can comprise more than 25% by mass of at least one layer of the fluidizable particles, or the layers are between 10 nm and 1000 nm in thickness, or at least 80% of the particles are less than 200 nm in diameter.

The tunable multilayer optical film can comprise a security device. In one such instance the tunable multilayer optical film is applied to an exterior surface of the security device, or it is encased within the security device. Polycarbonate is one example of a material in which the tunable multilayer optical film can be encased to form the security device.

Another form of the security device is one where the tunable multilayer optical film is encased within a security thread.

In yet another form of the security device is one where the tunable multilayer optical film is transferred onto a layer of the security device.

The security device could also comprise a pattern formed by the application of energy to the multilayer optical film. In such case the pattern could comprise a serial number, portrait, signature, finger print, dates or other data.

One of the useful purposes of the security device is for identifying an individual.

Another form of the security device is a banknote.

Another aspect of this disclosure is a method for fabricating the tunable multilayer optical film comprising the steps of:

preparing at least two dispersions, at least one of the dispersions containing fluidizable particles, the dispersions for forming layers in the tunable multilayer optical film;

coating the first dispersion onto a substrate so that the first dispersion forms a first layer;

coating the second dispersion onto the first layer to form a second layer;

coating each remaining dispersion onto a previous layer, which may be the same of different;

drying and/or curing the layers, either individually, in groups and/or all together to form the tunable multilayer optical film.

In another form, the method can include in the at least one dispersion containing fluidizable particles, a coating component.

The method could also further comprise the step of applying energy to the tunable optical multilayer optical film to change the optical properties of the tunable optical multilayer film.

Another step in the method may include the step of applying a stimulus to the tunable optical multilayer optical to fix the optical properties of the tunable optical multilayer film.

BRIEF DESCRIPTION OF THE DRAWINGS

Reference is made to the accompanying drawings which are used to illustrate and exemplify the thermally tunable multilayer film disclosed herein.

Magenta light (diffuse); iv) Thermochromic material; v) White, diffuse reflector; vi) Zone A—Cyan; vii) Zone B—Magenta; viii) Zone C—Yellow; ix) Zone A—Cyan; x) Zone B—Magenta; xi) Zone C—Purple; xii) Zone A—Purple; xiii) Zone B—Yellow; xiv) Zone C—Pink.

Figure 33:
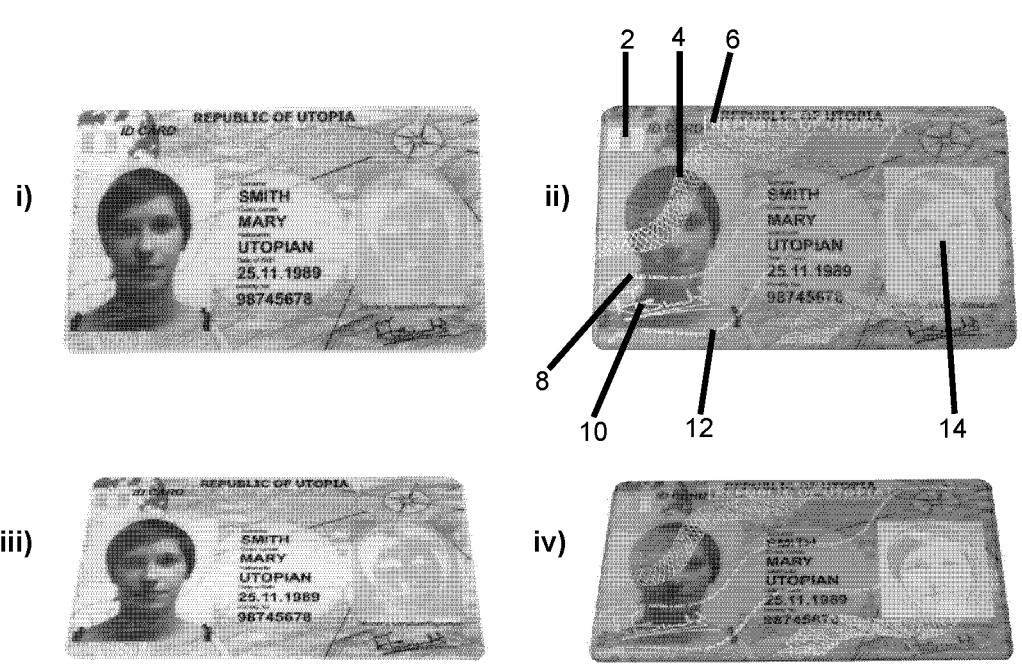

FIG. 33 illustrates a MOF laminate on an ID card, viewed in diffuse and specular reflection at two different angles. Different security features written within the MOF include: flag (2), guilloche patterns (4), text (6), wavy lines of text (8) & (12), signature (10), and a portrait (14). i) Diffuse reflection—Angle 1; ii) Specular reflection—Angle 1; iii) Diffuse reflection—Angle 2; iv) Specular reflection—Angle 2.

Figure 34:
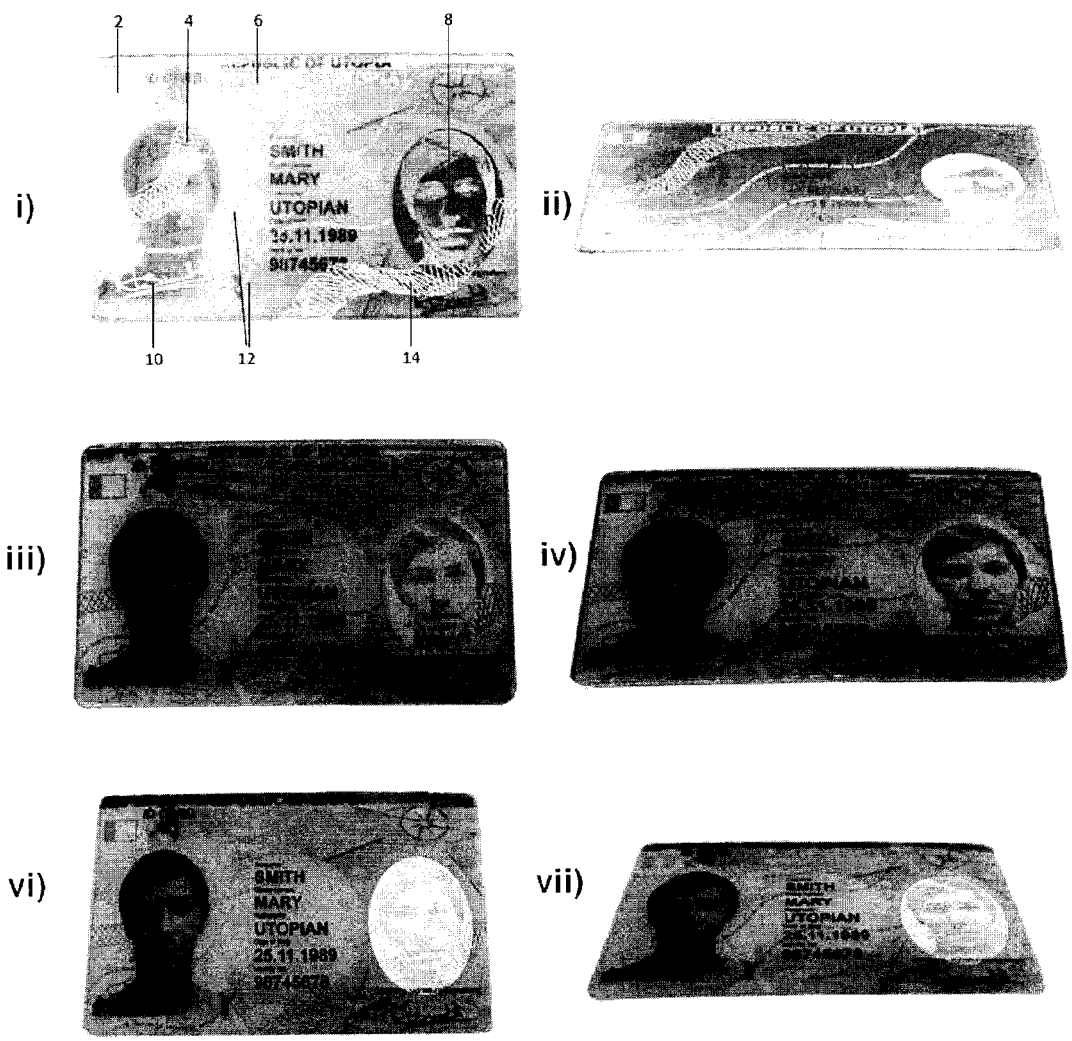

FIG. 34 illustrates a MOF laminate on an ID card having transparent window, viewed in diffuse and specular reflection, as well as in transmission, at two different angles. Different security features written within the MOF include: flag (2), guilloche patterns (4) & (14), text (6), portrait (8), signature (10), and wavy lines of text (12). i) Diffuse reflection—Angle 1; ii) Specular reflection—Angle 1; iii) Diffuse reflection—Angle 2; iv) Specular reflection—Angle 2; vi) Transmission—Angle 1; vii)Transmission—Angle 2.

Figure 35:
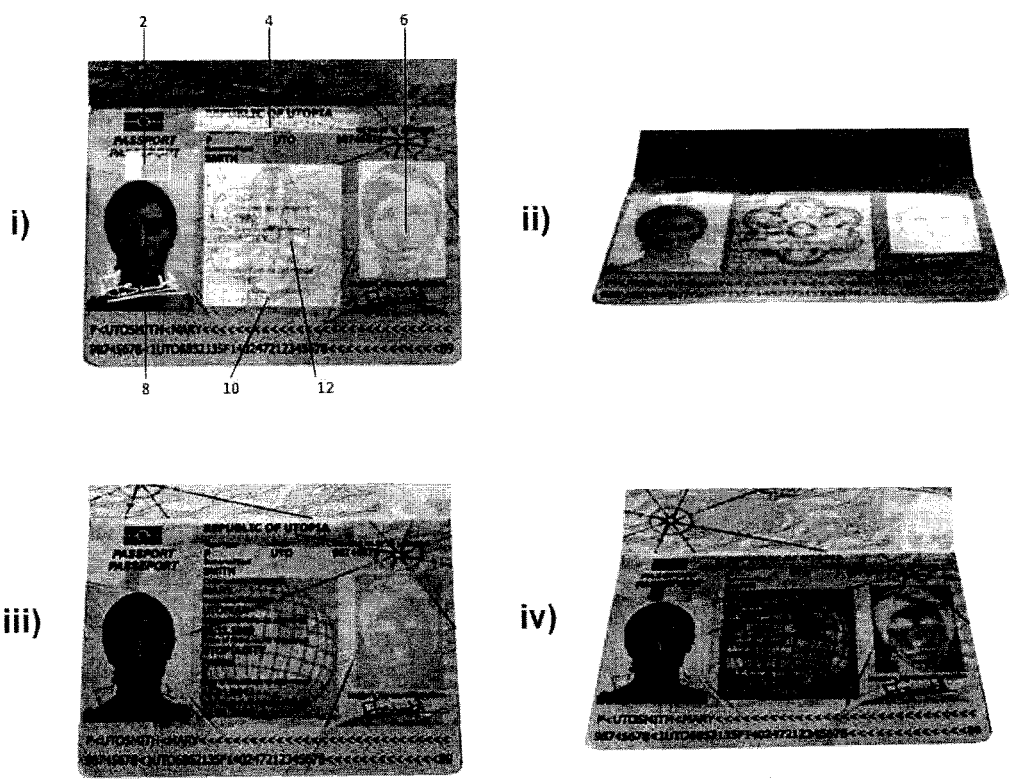

FIG. 35 illustrates a MOF laminate on passport data page, viewed in diffuse and specular reflection at two different angles. Different security features written within the MOF include: flag (2), text (4), portrait (6), signature (8), wavy lines of text (10), and guilloche patterns (12). i) Diffuse reflection—Angle 1; ii) Specular reflection—Angle 1; iii) Diffuse reflection—Angle 2; iv) Specular reflection—Angle.

Figure 36:
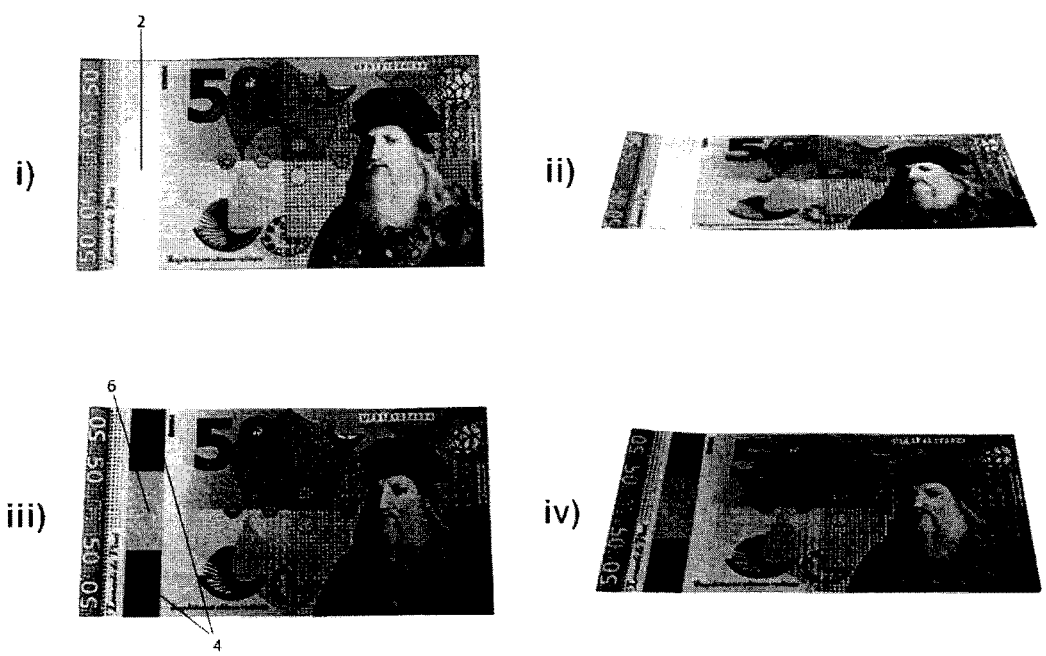

FIG. 36 illustrates a MOF laminate on a demonstration paper banknote. i) Diffuse reflection—Angle 1; ii) Specular reflection—Angle 1; iii) Diffuse reflection—Angle 2; iv) Specular reflection—Angle 2.

Figure 37:
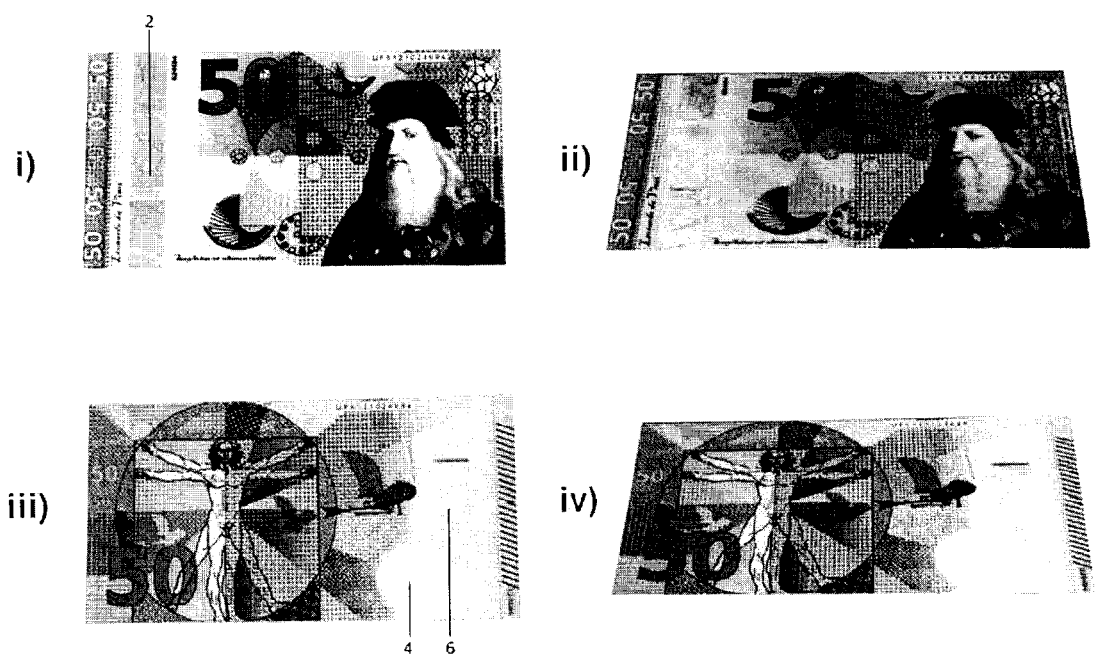

FIG. 37 illustrates a MOF laminates on a demonstration polymer banknote. i) Diffuse reflection—Angle 1; ii) Specular reflection—Angle 1; iii) Diffuse reflection—Angle 2; iv) Specular reflection—Angle 2.

DETAILED DESCRIPTION

MOF Description

A MOF may comprise two or more layers of different composition, which may be in a periodic alternating arrangement, or a different arrangement. A MOF may consist of alternating layers of low refractive index material with high refractive index material. These layers may be substantially flat and uniform.

While a MOF may comprise layers with any difference in refractive index, it is preferable for the difference in refractive index to be at least 0.05 in order for the MOF to have useful reflection characteristics.

A MOF may have any number of these layers. At the lower end, a MOF may show optical properties with as little as two to three layers. At the upper end, a MOF may have more than 1000 layers, should the manufacturing route allow for the fabrication of these layers. The higher the refractive index contrast, the greater will be the intensity of reflected wavelengths (see equation 2), and a lower number of layers may be required to obtain a useful effect.

These layers may be between 5 nm and 5000 nm in thickness, more preferably between 10 nm and 1000 nm in thickness.

Initial Optical Properties

The tunable MOFs as described herein have an initial reflected wavelength range, which has a number of features as known in the art, and as described in the background section. The optical properties of MOFs are well known, and the effect of variations in layer types, numbers, thicknesses, refractive indices, and other optical parameters (e.g., absorption, scattering) can be accurately understood and modeled. In the case of a MOF comprising two different layers in a periodically repeating arrangement, the initial reflected wavelength range may have the following optical properties;

The tunable MOF may have a first-order reflection peak, the position of which is governed by the optical thicknesses of the alternating layers in the multilayer (equation 1).

The MOF may also have higher-order reflection peaks, corresponding to fractions of the first-order reflection peak (equation 5).

The MOF may comprise two or more layers. In general, the greater the amount of layers, the greater will be the scattering properties, and the more prominent will be the reflection properties. If a MOF comprises two layer types in a repeating and periodic arrangement, the intensity of the reflection peak can be approximated by equations 2 and 3.

The intensity and width of the first and higher-order reflection peaks may be related to the refractive index contrast between layers, with a higher refractive index contrast leading to a greater reflection intensity, and an increase in reflection peak breadth (equations 2-4).

The intensity of the first and higher-order reflection peaks may be related to the ratio in optical thicknesses of the layers in the system, or the f-ratio, as described above (see equation 6). Depending on the choice of f-ratio, the intensity of particular reflection orders may be maximized, minimized, or may have intermediate intensities, as known in the art.

If the materials in the MOF are relatively transmissive (non-absorptive) to the wavelengths of interest, the transmission properties of the MOF may be largely complimentary to the reflection properties. That is, while certain wavelength ranges may be reflected from the MOF, the remaining wavelengths may be transmitted through the material. The reflected wavelengths from a MOF show angle-dependent properties. When the light impinges on the MOF at an angle perpendicular to the layer direction, there is a particular reflected wavelength range. As the angle of incident light increases from the perpendicular, there may be a blue-shift in the reflected wavelength (reflection of shorter wavelengths), as known in the art.

A MOF may also comprise more than two layer types, partially periodic arrangements, or even non-periodic arrangements. For example, a MOF having a gradient in layer thicknesses may result in a broader reflection peak, (see Macleod, H. A.; Thin-film optical filters, 3rd edition, Institute of Physics Publishing, 641 p. and U.S. Pat. No. 5,568,316), and certain layer arrangements may be intentionally designed to minimize higher-order reflections (see U.S. Pat. No. 5,360,659). And, even in the case of a periodic repeating structure, variations in manufacturing may cause natural deviations from ideal properties.

Voids and their Arrangement with Particulate Material

In some embodiments, one or more of the layers may contain particles which are in an arrangement such that interstitial void spaces (i.e., voids) are present between them. The particles may be touching each other, with voids naturally present between them, like the spaces between packed marbles.

In another form, both alternating layers within the material can comprise particles. These particles may be deposited alternatively, and may pack together in such a way as to create voids between them. The particles may be densely packed, resulting in minimized void space between them. The particles may also be less densely packed, with a reduction in density resulting in a greater proportion of void space between the particles. The layers may comprise other components apart from the particles, which may be used to modify the optical, mechanical, adhesion, or other properties of the layers, or which may also influence the particle deposition process. These may include polymer binders, inorganic binders, rheology modifiers, refractive index modifiers, adhesion promoters, surfactants, leveling agents.

The interstitial void space within the one or more layers of the MOF before applying any energy to it can range in proportion from 1% to 99% by volume, more preferably between 5% to 80% by volume. The level of porosity depends on the density of packing of the particles and the level of other components which may fill at least a part of the void space.

The particles can be substantially monodisperse, or polydisperse, or may have a multi-modal size distribution. As indicated the particles may be selected from microparticles and nanoparticles. The particles can be arranged and packed in a variety of ways: The particles can form a substantially ordered (long-range or short-range) arrangement, or be substantially disordered, or mixtures of the two. The particle size distribution and packing will largely influence the degree and type of porosity in the particle-containing layer: A dense, ordered packing of substantially monodisperse spheres would give a porosity of 26% from geometric considerations. Disordered packing of spheres would give porosity higher than 26%, depending on the amount of disorder and space. Polydisperse particles may in some cases give porosity lower than 26%, in the case where particles of different size allow for a denser packing than allowed with monodisperse particles. Polydisperse particles may also give higher porosity than 26%, if size mismatch between particles prevents assembly into a dense structure.

Figure 1:
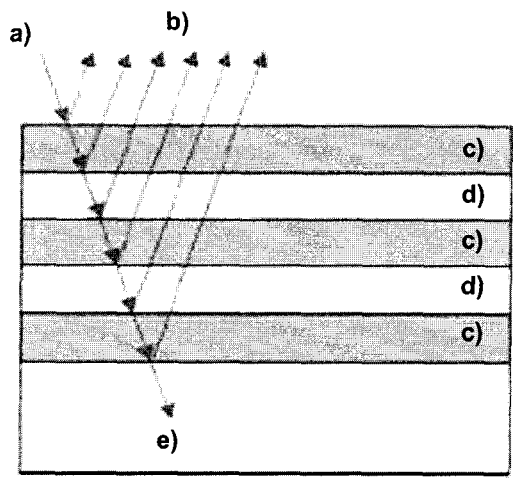
FIG. 1 illustrates an example of a MOF structure. a) Incident light, b) reflected light, combination of multiple beams, c) High index layers, d) Low index layers, and e) transmitted light.
Figure 2:
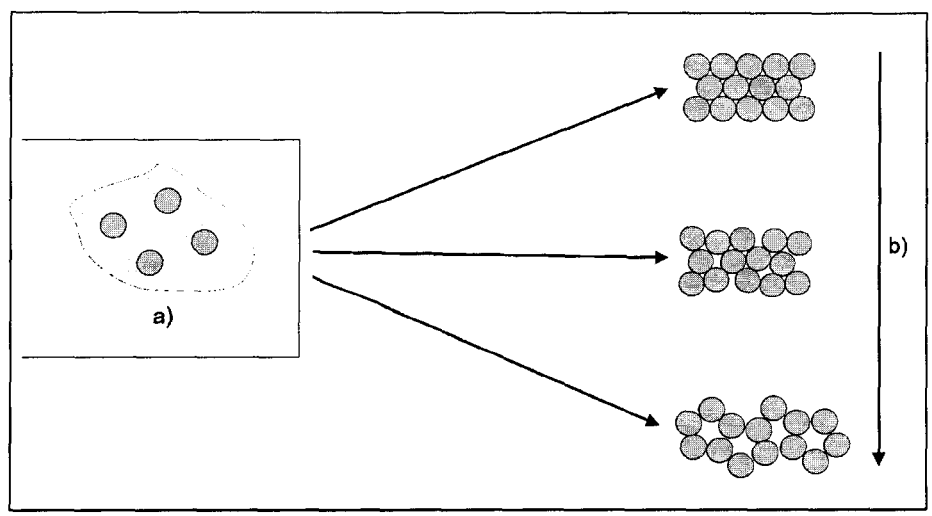
FIG. 2 illustrates porous layers created through the deposition of a dispersion of particles, such as polymer particles. At a) there is shown a dispersion of polymer particles in a carrier, and at b) the increasing porosity is shown.

One way to generate a particle-containing layer is through the deposition of particles contained in a liquid carrier, followed by evaporation or drying of this carrier. The particles deposited in this manner may be film-forming (or partially film-forming) fluidizable particles, or particles that can, with the addition of other reagents, form a film-forming (or partially film-forming) fluidizable particle layer. One example of such is a dispersion of polymer particles in a solvent. The packing of particles within a layer may also be influenced by chemistry and process during manufacture, as described later herein. The particles may be solid or partially solid at ambient temperatures such that they maintain the structural stability of the voids. In FIG. 2 there is illustrated the packing of particles at different levels of density, when deposited from a liquid carrier.

Film-forming particles are well known in the art, and form the basis for instance of the majority of consumer paints. Typically these comprise a water-based dispersion of polymer particles, called a latex. Latex science and technology is an established field, with a very large prior art base. (J. L. Keddie, A. F Routh, Fundamentals of Latex Film Formation: Processes and Properties. Springer, 308 pages (2010); P. A. Steward, J. Hearn, M. C. Wilkinson, An Overview of Polymer Latex Film Formation and Properties, Advances in Colloid and Interface Science, Vol 86, pp 195-267 (2000)). Most latexes are film-forming: That is, the particles are soft and fluid at ambient temperatures, such that once the water-based solvent mixture is evaporated, the particles will fuse and consolidate into a non-porous polymer film.

There also exist a lesser diversity of latices formed from non-film-forming particles, that is particles that are solid and non-flowing at ambient temperature (see for example: U.S. Pat. No. 4,094,841. Highly monodisperse latices of non-film forming polymers). In many cases these non-film-forming particles may be fluidizable at elevated temperatures, provided the constituent polymer is fluidizable.

During deposition from a liquid carrier to create a MOF, a formulation containing fluidizable particles can be film-forming, or at least partially film forming. That is, the coating may produce a layer which holds together sufficiently to allow for handling and manipulation in the normal course of manufacturing, storage, and application. Furthermore, the layer may also hold together sufficiently to allow for subsequent liquid depositions on top of this layer without damaging said layer, as required for the manufacture of a MOF.

Non-film forming particles would not be expected to form a film on their own, much as a layer of sand grains would not be expected to hold together as a film. However, a number of factors may enter into the film-forming ability of such particles or formulations containing said particles.

Structure/properties of polymer latices: Latices are produced in a water-based medium, and result in particles of hydrophobic polymer dispersed in a hydrophilic liquid medium. These may be produced via emulsion, microemulsion, dispersion, or other dispersed-phase methods. In order to achieve a stable dispersion, polymer particles in a latex are necessarily stabilized by a surface layer. This surface layer may be a layer of miscibilizing surfactant or stabilizing polymer. The particle itself may have a surface layer or shell with a different composition from the bulk, being for instance enriched by a hydrophilic monomer. Or, the particle may be intentionally created as a core-shell particle, with a hard core and softer shell. In many cases this surface layer (surfactant/stabilizer layer and/or shell of different composition) may be softer than the bulk of the particle, and may provide for more stable contact points between particles via the contact surfaces deforming and providing a greater surface area or chemical interaction. Furthermore, the smaller the particle in the latex, the greater will be the proportion of a surface layer or shell, due to the increased surface-to-bulk ratio for smaller particles, and smaller particles may therefore demonstrate superior film-forming properties.

Coating Components: A number of different coating components are known and used extensively in the field of coating. These may include surfactants, stabilizers, co-solvents, and the like. Such coating components may aid in the film-forming properties of a layer containing fluidizable particles. In one example, solvents or co-solvents may temporarily soften the particles, allowing their contact surfaces to at least partially compress together, thereby providing increased stability to the particle film. In another example, surfactants and stabilizers which are non-volatile may remain in the voids between the particles following drying of the coating formulation, which may provide sufficient cohesion between particles to stabilize a film.

Process Parameters: It is possible for parameters in the coating process to influence the film-formation of a particle layer. For example, exposure of a particle film to elevated temperature for a brief period of time may allow for partial melting of the particles and increased contact area, while still preserving porosity within the layer. (see for example: EP 0369466A2, Preparation of a porous film of polytetrafluoroethylene)

Fluidizable particles are any particles capable of becoming fluid at a transition temperature. It is preferable for this transition temperature to be within the range of approximately 10 to 300 degrees C.: If the transition temperature is too low the particles would already be fluid at ambient temperature. If the transition temperature is too high, applying the required thermal energy might cause thermal damage to the material or surrounding materials. A diversity of such fluidizable materials exist in the art. Materials with known melting points or glass transition temperature include:

Salts, especially fusible salts with a relatively lower melting temperature. While most salts have quite high melting temperatures, salts of cations based on imidazolium or pyridinium moieties are known to melt at lower temperatures, and in some cases are even liquids at ambient temperature (so-called ionic liquids). Sodium chloride, common table salt, has a melting temperature of approximately 800 C, too high for practical applications. However, this salt may be suitable should there be some proportion of water in the system which might depress the melting temperature.

Organic or inorganic molecular compounds, a great many of which may be solid at ambient temperatures, but become fluid at increased temperatures.

Polymers which are crystalline or glassy at ambient temperature, most of which may be fluidizable provided there is not sufficient crosslinking present as to impart the polymer with a permanent shape. A list of different classes of polymers can be found later in this document.

Ionomers, for example solid polymers which may contain ionic groups which function as physical crosslinking points which melt apart at a transition temperature. An example of such a material is Surlyn™ by Dupont.

In some forms, inclusion of molecular or polymeric components may cause a partial or complete filling of the interstitial void space.

Layers may comprise mixtures of particles with other components which may or may not be particles, such as organic, inorganic, ionic, polymeric, molecular, colloidal, or other components, which may partially fill the void space between particles. Some other types of components may cause an increased porosity between particles, by keeping them further apart.

In some embodiments, additional voids or porosity may be created in one or more layers through the use of a porogen or sacrificial template. Through application of a stimulus, the porogen or sacrificial template may be removed, thereby generating porosity. This process may occur through vaporization of solvent, vaporization of sublimable solid, or etching of material by solvent dissolution, acid/base etching, or other specific chemical etching. (See for example: Velev, O.D., Lenhoff, A. M. Colloidal crystals as templates for porous materials, Current Opinion in Colloid & Interface Science, Vol 5, Iss 1-2, pp 56-63; Polarz, S., Antonietti, M. Porous materials via nanocasting procedures: Innovative materials and learning about soft-matter organization, Chemical Communications, Iss. 22, pp 2593-2604, 2002)

Additional porosity may also be created through known chemical and material techniques, as known in the art, including aerogels/xerogels (Gesser, H. D., Goswami, P. C. Aerogels and related porous materials, Chemical Reviews, Vol 89, Iss 4, pp 765-788), supercritical fluid processing (Cooper, A. I. Porous materials and supercritical fluids, Advanced Materials, Vol 15, Iss 13, pp 1049-1059), metal-organic frameworks and intrinsic porosity materials (Thomas, A. Functional Materials: From Hard to Soft Porous Materials, Angewandte Chemie, Vol 49, Iss 45, pp 8328-8344), emulsion templating (Zhang, H. F., Cooper, A. I. Synthesis and applications of emulsion-templated porous materials, Soft Matter, Vol 1, Iss 2, pp 107-113), foaming, gas inclusion, and others (See for example: Wu, D., Xu, F., Sun, B., Fu, R., He, H., Matyjaszewski, K. Design and preparation of porous polymers, Chemical Reviews, Vol 112, Iss 7, pp 3959-4015)

The porosity within one or more layers may also be further adjusted by exposure to an annealing step, involving exposure to heat, solvent, UV, time, shear, compression/pressure, calendaring, or others, which may result in a reduced porosity. In this way, porosity may be tuned from its initial level (see above paragraph), all the way to 0% by complete annealing.

Voids may be present in only one layer, or in more than one layer.

Both the high and low index layers may comprise voids.

In some embodiments, the fluidizable particulate material and voids are a principal determinant of the optical thickness of the layer that they comprise. Because this principal determinant is thermally responsive, the tuning range of the MOF is extended.

Particulate Material

In the described invention, either one or more layers in the MOF comprises particles which are thermally responsive. This thermal response may include a phase change (for instance, going from solid to liquid, or liquid to solid, or liquid/solid to gas, and vice versa), a change in crystallinity, a change in viscosity, a change in volume, a change in shape, which may in turn change the form of the particulate material. In one form of the MOF, the fluidizable particles may at least partially fuse together or consolidate. As such, a particle assembly may be fused into an aggregate or network, whereby the individual particle characteristics are lessened.

In an embodiment, the thermal response comprises an increase in fluidity. This may include a change from a solid to a fluid, or from a less fluid state to a more fluid state, thereby allowing a change in form of the thermally responsive particulate.

Where the at least one thermally responsive layer in the MOF comprises fluidizable particles, the percentage content of these particles may range from 5% to 100% by mass, more preferably between 20% and 100%. The greater the proportion of fluidizable particles, the greater the potential tunability of the MOF.

Figure 3:
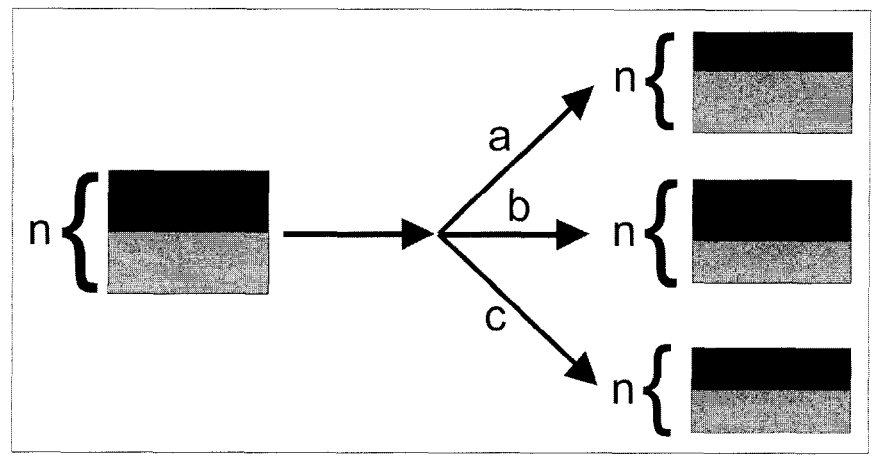
FIG. 3 illustrates that a decrease in optical thickness may occur in the first layer (a), the second layer (b), or in both layers simultaneously (c).

In some embodiments, this change in response to a thermal stimulus, may result in a change in optical thickness of one or more of the layers. In a particular embodiment, exposure to a temperature above a threshold temperature causes a decrease in optical thickness of one or more of the layers. In a system comprising two alternating layer types, this decrease in optical thickness could occur in only the first layer (a), only the second layer (b), or in both layers (c)(see FIG. 3). In the case that optical thickness decreases in both layers, each layer may decrease at different times or rates, or the decrease may be simultaneous.

The particles may be selected from materials including polymers (e.g., polystyrene or polymethylacrylate), metals, semiconductors, insulators (e.g., titanium oxide or silica), inorganic materials, salts, organics, water-soluble materials, gels, or combinations thereof. The particles may be in the form of spheres (e.g., monodisperse microspheres), ellipsoids, rods, sphere containing polyhedra, cubes, or polyhedra. The particles may be formed as freestanding monolith structures such as a three-dimensional crystal (e.g., a face-centered cubic crystal), including single-crystalline or polycrystalline structures. Particles may comprise a bare surface, or may be chemically modified with a layer of atoms, molecules, polymers, or material.

The surface of the particles may be modified by a number of methods as is referenced in EP 0711199 B1. One of the methods is to incorporate charged end groups on the surface of the particle using water soluble initiators in the polymerization process. Another method for modifying the surface of the particles is to introduce monomers, which would induce an electrostatic charge and/or provide a layer of hydrated polymer. These monomers may be a component of the monomer mixture of the unseeded dispersion polymerization or be introduced into a seeded dispersion polymerization. Such monomers include, for example, acrylic acid and/or hydroxyethylacrylate.

In one form of the device, one or more of the layers comprises a thermally responsive material, in particular a thermally responsive polymer, which displays a threshold temperature due to either a glass transition temperature or a melting point temperature. Upon reaching the threshold temperature, the polymer component may undergo a change, which then changes the optical thickness of one or more of the layers. This change may be a phase change (for instance, going from solid to liquid, or liquid to solid, or liquid/solid to gas, and vice versa), a change in crystallinity, a change in viscosity, a change in refractive index, a change in volume, or a change in shape, for example. In some embodiments, this change results in a change in optical thickness of one or more of the layers. In a particular embodiment, exposure to a temperature above a threshold temperature causes a decrease in optical thickness of one or more of the layers. In a system comprising two alternating layer types, this decrease in optical thickness could occur in only the first layer (a), only the second layer (b), or in both layers (c) simultaneously (see FIG. 3)

In some embodiments, the thermally responsive particles may be polymer particles, where the thermal transition could be either a glass transition or a melting transition. The thermal transitions of polymers are well-known in the art (R. O. Ebewele, Polymer Science and Technology, CRC Press, 2000), and can be tuned and predicted by various factors such as:

Cross-linking: Increased crosslinking will increase the temperature threshold, as well as reduce the mobility of a molten/liquid state, resulting in a decreased response to temperature.

Molecular weight: Higher molecular weight will lead to an increase in temperature threshold.

Chain ends: Increase in the number of chain ends will depress the temperature threshold.

Copolymerization: Copolymerization can lead to thermal transitions intermediate to the individual thermal transitions of the respective homopolymers.

A variety of other factors may be of influence, as described in the above cited reference (R. O. Ebewele, Polymer Science and Technology, CRC Press, 2000): Polymer architecture, chain flexibility, geometric factors, interchain attractive forces, crystallinity, plasticization, intermolecular bonding, and others.

In some cases, polymer particles may comprise more than one component, where the thermal transition is an average or combination of the individual thermal transitions. In some forms, the polymer particles might comprise a copolymer of two of more individual monomers. The resulting particles might be substantially homogenous, such that the different species within the copolymer are relatively evenly distributed. In another form, the different species within the copolymer might display some degree of phase separation, such that regions of different composition are present within the polymer particle.

Polymer particles may be spatially inhomogenous, for instance those particles having a core-shell configuration, with two or more different materials arranged concentrically. This may allow for the integration of more than one beneficial property. In a specific instance, the core may comprise a relatively hard polymer with a Tg or melting temperature above room temperature, whereas the shell may comprise a relatively soft polymer. The soft polymer shell may flow and consolidate, bridging neighbouring particles, which may result in a more mechanically stable layer. Particles may have more than one shell, or be arranged in more complex geometries, such as in the form of a raisin bun, dumpling, or other structures.

Polymer particles may be comprised of a variety of individual or mixture of polymers, including those listed in the previously referenced patent publications.

Polymer particles can be prepared from free radical addition polymerization or condensation polymerization. In a preferred embodiment, the polymer particles are prepared using techniques well known in the art to prepare dispersion, suspension or emulsion-polymerized addition polymers. Conventional surfactants may be used such as, for example, anionic, cationic, and/or nonionic emulsifiers such as, for example, alkali metal or ammonium alkyl sulfates, alkyl sulfonic acids, fatty acids, and oxyethylated alkyl phenols. The amount of surfactant used may be from 0.1% to 30% by weight, based on the weight of total monomer. Either thermal or redox initiation processes may be used. Conventional free radical initiators may be used such as, for example, hydrogen peroxide, t-butyl hydroperoxide, ammonium and/or alkali persulfates. Redox systems using the same initiators coupled with a suitable reductant such as, for example, isoascorbic acid and sodium bisulfite may be used.

The diameter of the polymer particles may be controlled by the amount of conventional surfactants added during the polymerization process as is disclosed in U.S. Pat. No. 6,750,050. It is known in the art that by increasing the amount of surfactant added during polymerization, the diameter of the polymer particles can be reduced and by reducing the amount of surfactant, one can increase the diameter of the polymer particles. Conventional surfactants include anionic, cationic, nonionic emulsifiers or their combination. Typical anionic emulsifiers include alkali or ammonium alkyl sulfates, alkyl sulfonic acids, and fatty acids. Typical non-ionic emulsifiers include polyoxyethylated alkyl phenols, alkyl phenol ethoxylates, polyoxyethylated straight-chain alcohol, amine polyglycol condensate, modified polyethoxy adducts, polyoxyethylated mercaptans, long chain carboxylic acid esters, modified terminated alkylaryl ether, and alkyl polyether alcohols. Typical cationic emulsifiers include charged or quaternized amines.

The polymer particles are preferably copolymers of at least one ethylenically unsaturated monomer, such as, for example, acrylic or methacrylic ester monomers including methyl (meth)acrylate, ethyl (meth)acrylate, butyl (meth)acrylate, 2-ethylhexyl (meth)acrylate, decyl (meth)acrylate, lauryl (meth)acrylate, isobornyl (meth)acrylate, isodecyl (meth)acrylate, oleyl (meth)acrylate, palmityl (meth)acrylate, stearyl (meth)acrylate, hydroxyethyl (meth)acrylate, and hydroxypropyl (meth)acrylate; acrylamide or substituted acryl amides; styrene or substituted styrenes; butadiene; ethylene; vinyl acetate or other vinyl esters; vinyl monomers, such as, for example, styrene, vinyl chloride, vinylidene chloride, N-vinyl pyrrolidone; amino monomers, such as, for example, N,N'-dimethylamino (meth)acrylate; and acrylonitrile or methacrylonitrile. Additionally, copolymerizable ethylenically-unsaturated acid monomers such as acrylic acid, methacrylic acid, crotonic acid, itaconic acid, fumaric acid, maleic acid, mono methyl itaconate, mono methyl fumarate, monobutyl fumarate, maleic anhydride, 2-acrylamido-2-methyl-1-propanesulfonic acid, sodium vinyl sulfonate, and phosphoethyl methacrylate, may be used.

The emulsion polymerization techniques used to prepare such dispersions are well known in the art such as, for example, U.S. Pat. Nos. 4,325,856; 4,654,397; and 4,814,373 and are usefully employed in accordance with the invention.

Suitable stabilizing agents include water-soluble polymers, such as, for example, polyvinyl alcohols, cellulose ethers, and mixtures thereof are described in CA 2038502. Preferred stabilizers include proteins, polyvinyl alcohols, polyglycerol fatty acid esters, plant polysaccharides, cetyl trimethylammonium bromides and other alkyltrimethylammonium salts, cetylpyridinium chlorides, polyethoxylated tallow amines, benzalkonium chlorides, benzethonium chlorides, zwitterionics (amphoterics), dodecyl betaines, cocamidopropyl betaines, coco ampho glycinates, alkyl poly (ethylene oxides), alkylphenol poly(ethylene oxides), copolymers of poly(ethylene oxide) and poly(propylene oxide), alkyl polyglucosides, including octyl glucosides and decyl maltosides, fatty alcohols, cetyl alcohols, oleyl alcohols, cocamide monoethanolamines, cocamide diethanolamines, polysorbates, codecyl dimethylamine oxides, alginic acids, sodium alginates, potassium alginates, ammonium alginates, calcium alginates, propane-1,2-diol alginates, carrageenans, locust bean gums (carob gums), guar gums, tragacanths, gum acacias (gum arabics), xanthan gums, sorbitols, mannitols, glycerol, pectins, amidated pectins, microcrystalline/powdered celluloses, methylcelluloses, hydroxypropylcelluloses, hydroxypropyl-methylcelluloses, ethylmethylcelluloses, carboxymethylcelluloses, mono- and di-glycerides of fatty acids, esters of mono- and di-glycerides of fatty acids, sucrose esters of fatty acids, sucroglycerides, polyglycerol esters of fatty acids, and propane-1,2-diol esters of fatty acids.

Description of Changes in Particulate/Void Arrangement

In a MOF, the reflected wavelength range is a function of the thickness and refractive indices of the individual layers, as previously described. Any change in dimension or refractive index of any of the layers would result in a change in optical thickness of the layer, and therefore to a change in optical properties. In the context of this invention, a change in particulate/void arrangement may cause a change in optical thickness of one or more of the layers.

In one form of the device, at least one of the layers may have porosity, and exposure to temperatures above a thermal threshold of the material may cause a disruption in this porosity. In one particular form, exposure to temperatures above a thermal threshold results in at least a partial collapse (i.e., elimination) of the pores within at least one layer in the material. In another form, this at least partial collapse of the pores may result in a decrease in pore volume, which would decrease the optical thickness of one or more layers of the photonic crystal, which may correspondingly result in a change in the reflectance away from the initial wavelength range.

In another form, the materials may comprise void spaces, as well as one or more polymer components. Upon exposure to a temperature above a particular threshold temperature, the thermal stimulus may cause one or more of the polymer components to deform and/or flow, which may consequently in whole or in part distort, infiltrate, or collapse the void spaces in the material.

In another form, the porosity may be present in the same layer as the responsive polymer. In this case, exposure of the material to a temperature above a threshold temperature may cause the polymer component to become at least partially fluid, which may cause the matrix around the pores to soften, sag, or flow, which may collapse at least a portion of the porosity within this same layer.

In yet another form, the porosity may be present in a different layer than the responsive polymer. In this case, exposure of the material to a temperature above a threshold temperature may cause the polymer component to melt or flow, at which point it may migrate into at least a portion of the pores in the porous layer. The infiltration of the polymer into the pore space of the porous layer would cause an increase in the optical thickness of the porous layer, since a material of lower refractive index (air: Refractive index of 1) would be replaced by a material of higher refractive index (polymer: Refractive index typically between 1.4 and 1.6). The kinetics of migration of a fluid into a porous layer might be influenced by a number of factors, including pore size, shape, distribution, surface chemistry, connectivity, amongst others.

Figure 4:
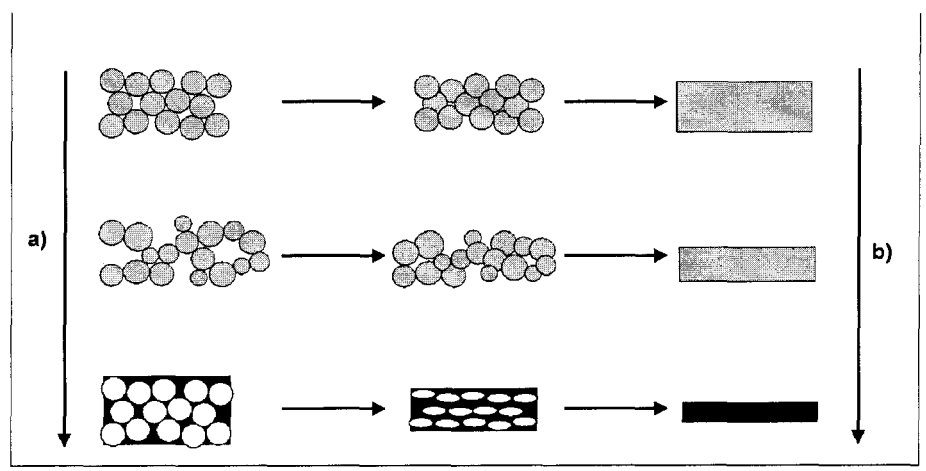
FIG. 4 illustrates layers of increasing porosity resulting in an increasing degree of decrease in layer thickness upon collapse of the pores. a) Increasing porosity, b) decreasing final thickness.

In one form of the device, at least one of the layers may have porosity which may be present between the thermally responsive particulate material. Exposure to temperatures above a thermal threshold may cause a change in form in the particulate material, which may result in at least a partial collapse of the pores within at least one layer in the material. In another form, this at least partial collapse of the pores may result in a decrease in pore volume, which may decrease the optical thickness of one or more layers. The greater the porosity, the greater may be the potential decrease in optical thickness. See FIG. 4, which illustrates thermal melting of structures with different volume fraction of porosity. In the case of void collapse within a layer, the proportion of voids may range from its original value, all the way to 0% of its original value. This would decrease the optical thickness of this layer. The optical thickness might range anywhere from the initial optical thickness to the optical thickness of a fully collapsed layer. For example, a layer may initially have a porosity of 75% (made of air with refractive index of 1), a solid content of 25% (having a refractive index of 1.5), and a geometric thickness of 400 nm. The initial optical thickness would therefore be [(1.5*0.25)+(1*0.75)]*400 nm=450 nm. Should all this void space collapse, the layer would shrink down to a geometric thickness of 100 nm having a refractive index of 1.5. This layer would therefore have an optical thickness of 150 nm.

The extent of the collapse of the void space may be dependent on the amount of heat transferred to the thermally responsive MOF. In some cases, exposure to a temperature higher than the threshold temperature may result in complete collapse of the pores within at least one layer material. In this case, further exposure to temperature would not result in any further collapse of the pores. In a particular form, the porosity may be present in the same layer as the thermally responsive particles. In this case, exposure of the material to a temperature above a threshold temperature may cause the fluidizable particles to experience an increase in fluidity and thereby to soften, sag, or flow, which may collapse at least a portion of the porosity within this same layer.

Figure 5:
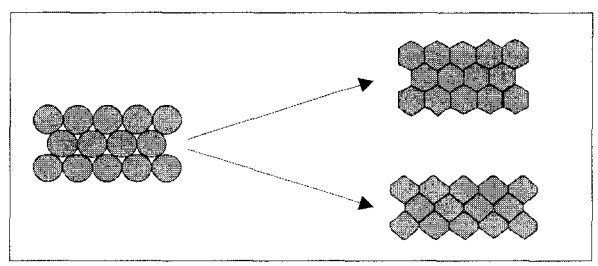
FIG. 5 illustrates the consolidation of meltable particles which may occur isotropically (top right) or anisotropically (bottom right).

In some forms, collapse of the voids space between particles may occur relatively isotropically, that is the shrinking and volume reduction occurs relatively similarly in all directions. If on a substrate which is incompressible, this may lead to a stress within the layer, which in some cases may lead to cracking or delamination. Alternatively, the collapse of the voids space may occur relatively anisotropically, whereby the shrinking and volume reduction occurs substantially differently in different directions. In a particular form, the shrinking and volume reduction occurs substantially in the direction perpendicular to the substrate surface, which may result in a more stable layer due to the relative lack of contraction forces parallel to the layer, especially if this layer is on a substrate (see FIG. 5). In some cases, the structure may seek to contract in the lateral direction, but this contraction may be prevented in whole or in part due to bonding to a substrate.

In an embodiment, the fluidizable particles may be converted into a more flowable form upon exposure to temperature, which may then infiltrate at least a portion of the void space in one or more layers. In general, the infiltration of voids by a fluid component could cause an increase in refractive index of the void-containing layer, since air (with a refractive index of 1) is being replaced by a material with a refractive index higher than 1. However, the flow of material into the void space may also be accompanied by a volume decrease in one or more layer, due to in the fluidizable particle material flowing out of the layer.

In the case of infiltration of void space by the fluid component, the maximum increase in optical thickness for the layer being infiltrated would be determined by the proportion of void space being infiltrated, and the refractive index of the infiltrating material. The higher these are, the greater the potential increase in optical thickness.

On the other hand, if a material from one layer is fluidizable and infiltrates the voids in a neighbouring layer, the optical thickness of the fluidizable layer would also decrease proportionally to how much material flows into the neighbouring layer. The maximum decrease in the thickness of this layer would depend on the amount of void space in the neighbouring layer. If the void space in the neighbouring layer were sufficiently large, it is conceivable that all of the material in the fluidizable layer could be transferred into the neighbouring layer, and the resulting optical thickness of the fluidizable layer could be decreased to zero.

In some forms, exposure to a temperature higher than the threshold temperature may result in complete infiltration of the pores in at least one layer resulting from flow of the temperature responsive component. In this case, further exposure to temperature would not result in any further infiltration of the pores.

In one embodiment, void space may be present in a different layer than the fluidizable particles. In this case, exposure of the material to a temperature above a threshold temperature may cause the fluidizable particles to melt or flow, at which point they may migrate into at least a portion of the pores in the porous layer. The infiltration of the fluidized particles into the pore space of the porous layer would cause an increase in the optical thickness of the porous layer, since a material of lower refractive index (air: refractive index of 1) would be replaced by a material of higher refractive index (typical polymers: refractive index typically between 1.4 and 1.6). The layer originally containing the fluidizable particles, however, would decrease in optical thickness by an amount corresponding to the amount of material which has infiltrated the adjacent layer(s). The kinetics of migration of a fluid into a porous layer might be influenced by a number of factors, including properties of the fluid such as viscosity, surface tension, volatility, vapor pressure, amongst others, and properties of the porous layer such as pore size, shape, distribution, surface chemistry, connectivity, amongst others.

The high index layers may also incorporate void spaces, which may also collapse upon exposure to a threshold temperature. Alternatively, such void spaces in the high index layer may be infiltrated by a melted, flowable component in the low index layer, which may change the net refractive index as well as thickness of the high refractive index layer.

In some forms, exposure to a temperature higher than the threshold temperature may result in complete loss of porosity in all the layers in the system, at which point exposure to further heat would have no influence on the optical properties of the stack. As described in further detail below, this property may be taken advantage of, to improve the repeatability and reliability of patterning.

Figure 6:
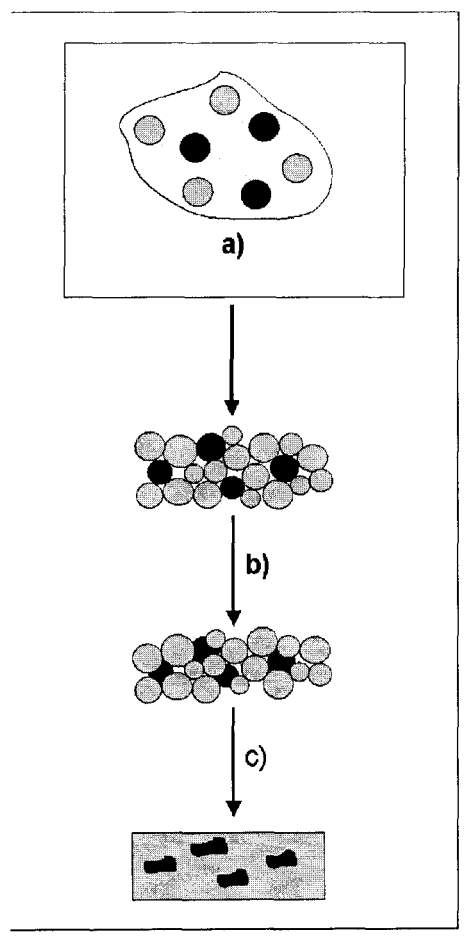
FIG. 6 illustrates that a layer containing two types of particles with different thermal transitions may also display multiple thermal transitions. a) Dispersion of 2 particles in a carrier, b) melting of particle 2, c) melting of particle 1.

Ill some forms, two or more different particles may be present in one or more layers. The two or more different particles may have different thermal transitions, such as melting temperatures or glass transition temperatures. In such a case, the layer may have a first transition temperature, at which the first particle might melt and collapse or fill a portion of the void space, resulting in a decrease in porosity. The layer may have a second transition temperature, at which the second particle might melt and collapse or fill an additional portion of the void space, further decreasing the porosity (see FIG. 6).

Figure 7:
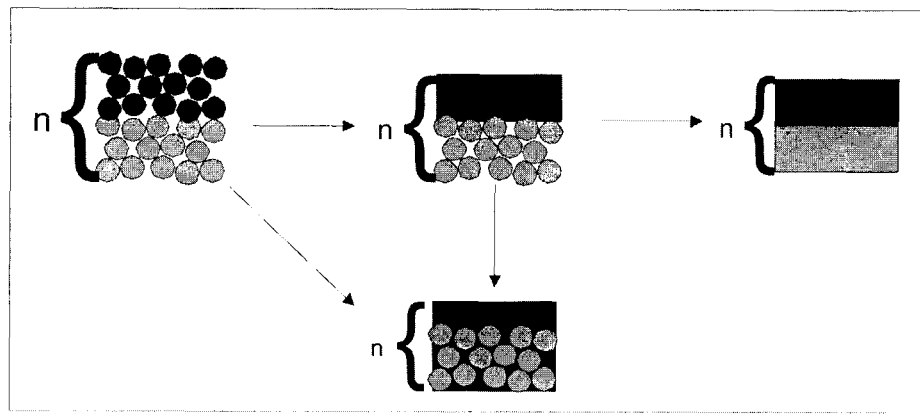
FIG. 7 illustrates an example of behavior of a thermally reactive MOF. The original MOF (left) contains layers with thermally reactive particles (black particles). Upon exposure to heat above a threshold, the black particles might melt or soften to collapse the porosity in one layer (middle, top). In some cases, the black particles may melt and infiltrate the pore space in the white particle layer (middle, bottom). In other cases, the white particles may also display a thermal transition, which may lead to a non-porous MOF (right).

In some embodiments, both layers may comprise porosity, and single or combination effects as described above could be achieved. FIG. 7 illustrates some simple and non-limiting examples of how such layers may react to temperature above a threshold temperature. In this image, the black particles may melt when exposed to a particular temperature threshold. These particles may melt, gradually reducing the fraction of pores in the layer until they form a non-porous polymer layer, which in some cases may remain as a segregated layer (middle, top). In some cases, the black particles may melt and infiltrate fully or partially the neighboring layer of white particles (middle, bottom). In some cases, the black and white particles may both melt, at the same or different times, resulting in relatively segregated layers.

In some cases the change in particulate/void arrangement may occur in a continuous fashion, with a dependence on the amount of heat transferred to the material, which may lead to a continuously tunable optical thickness in at least one of the layers. In other cases, the change in particulate/void arrangement may occur in a binary fashion, or in a multimodal fashion.

Changing or Altering Initial Reflected Wavelength

As described earlier, MOFs may have an initial reflected wavelength range with a number of features as known in the art. Due to the change in particulate/void arrangement, there may be a change in optical thickness in at least one of the layers, which may alter the initial wavelength range. These changes may include:

An alteration in the first-order reflection peak, the position of which is governed by the optical thicknesses of the alternating layers in the multilayer (equation 1).

An alteration of the higher-order reflection peaks, corresponding to fractions of the first-order reflection peak (equation 5).

An alteration in refractive index contrast between layers, which may influence the intensity and width of the first and higher-order reflection peaks (equations 2-4). An increase in refractive index contrast may lead to an increase in reflected peak width and intensity, and a decrease in refractive index contrast may lead to a decrease in reflected peak width and intensity.

An alteration in the ratio of optical thicknesses of the layers, or f-ratio (see equation 6). This may influence the intensity of the first and higher-order reflection peaks, as known in the art. Depending on the change in f-ratio, the intensity of particular reflection orders may be increased, decreased, or may be relatively unchanged.

Unless there are also changes in other properties such as absorption or scattering, the transmission properties of the MOF may remain largely complimentary to the reflection properties. That is, while certain wavelength ranges may be reflected from the MOF, the remaining wavelengths may be transmitted through the material.

Both initial and altered wavelength ranges may show angle-dependent properties, as described earlier. As the angle of incident light increases from the perpendicular, there may be a blue-shift in the reflected wavelength (reflection of shorter wavelengths), as known in the art.

In some cases, either the initial or altered wavelength range may be invisible to the human eye at certain angles, for instance if it is in the UV or IR range.

In some cases, the position of the some reflection peaks (such as the first-order reflection peak) may be in the infrared region. While this peak may be invisible to the human eye, the material may display some higher-order reflection peaks corresponding to diffraction of shorter wavelengths, which may fall within the visible spectrum and be visible to the human eye.

In some forms, at least a portion of the initial or tuned color may initially be visible, but upon tilting moves into a wavelength invisible to the human eye. For example, if the material is tilted such that the reflection is from a larger angle (less perpendicular), the reflected wavelength will blue-shift, and for some materials may blue-shift into the UV, thus becoming invisible to the eye. If the material is tilted such that the reflection is from a narrower angle (more perpendicular), the reflected wavelength will red-shift, and for some materials may red-shift into the IR, thus becoming invisible to the eye. In other forms of the device, at least a portion of the initial or tuned color may initially be invisible, but upon tilting moves into a wavelength visible to the human eye, similarly to the above.

Heat exposure may have a cumulative effect, such that the degree of spectral shift is proportional to the degree of heat, and the reflection peak can be tuned continuously over a given range. This may be a linear or non-linear change. This may result in multiple colors being reflected from the material, depending on the amount of heat transferred into the material.

Heat may also have a threshold effect, such that upon reaching a particular temperature or heat load, the material changes rapidly from one state to another (i.e. porous to non-porous), giving the impression of a binary change.

In some embodiments, the described materials may be used to create two or more color-shifting regions with different starting color and color-travel range. These two or more color-shifting regions could be generated in registry and in arbitrary locations.

Printing Process onto Tunable MOF

The change in initial wavelength range of the disclosed tunable MOFs may be changed controllably by exposure to a heat source, the heat source being controllable to selectively apply heat to one or more portions of the MOF and not the remainder of the MOF, wherein the heat being applied is equal to or greater than the thermal threshold of the MOF, in order to cause an optically detectable change in the heated portion(s) of the material. This method is described with respect to other devices in WO 2012/162805, previously referenced.

The thermal energy may be provided by a direct thermal source, or a radiant energy source which increases the temperature of the material. A direct thermal source may include a thermal head within a direct thermal printer, a hot-embossing roller, a heated element/tip/probe, or other heated element which may have a built-in pattern or graphic, or may be programmable as to controllably apply heat to certain regions of the material. This direct thermal source may itself have a temperature ranging from 10 degrees C. to 1000 degrees C., and may be either in direct thermal contact with the MOF of may be in indirect contact through a layer of air or other material. The thermal source may be in contact with portion of the MOF for a fraction of a second such as 0.01 seconds, all the way to several minutes. The thermal source may also apply pressure to the MOF material, which may improve the efficiency of heat transfer; the pressure applied my range from 0 in the case of contactless heating, all the way to pressures of several tons/inch as present in certain hot-embossing processes.

Also disclosed herein is a method for thermal printing of a thermally printable photonic crystal material or assembly, the method including: providing the photonic crystal material or assembly, the material or assembly having an optically detectable change in its reflection peak when exposed to a temperature equal to or about a thermal threshold; and exposing the photonic crystal material or assembly to a heat source, the heat source being controllable to selectively apply heat to one or more portions of the photonic crystal material or assembly and not the remainder of the photonic crystal material or assembly; wherein the heat being applied is equal to or greater than the thermal threshold of the photonic crystal material or assembly, in order to cause an optically detectable change in the heated portion(s) of the material or assembly.

In some examples, the heat source may be a thermal printer, a laser-writing system, a microheater array, or any other suitable source. In some examples, the heat profile provided by the heat source may be controlled by, for example a controller such as a programmable processor. In other examples, the heat profile provided by the heat source may be controlled through the use of a heated printing plate, screen, stamp, or embossing cylinder. In some examples, the heat source may be a hot embossing stamp or roller, or other type of heated printing head.

In some cases, heat may be applied through the use of a thermal printing system for thermal printing of a MOF material. The thermal printing may be used with a certain combination of print head type, print head pressure, print head writing speed, print head temperature, print head profile/shape, print head material, print head surface coating, and/or operating software, among other settings.

In some cases, heat may be provided by a laser writing system for thermal patterning of a thermally reactive MOF, the system including a laser for applying spatially inhomogeneous heat, a controlling system for the laser, and other structural components. System for controlling aspects of the laser, including laser wavelength, intensity, pulse width, pulse timing, focal depth, collimation, coherence, position, amongst others. The laser writing/marking system may be used with a certain combination of laser wavelength, pulse profile, pulse timing, intensity, focal depth, collimation, coherence, raster speed, etc. The system may include attenuating components, and other optical elements such as lenses, gratings, prisms, and might be controlled by operating software and hardware. In some forms, the photonic crystal material may be provided with additional layers below or above the photonic crystal material. These layers may comprise substrates, adhesives, protective coatings, optical layers, pigments/dyes, adhesion promoters, release layers, or other suitable materials.

In some embodiments, the MOF may contain, or be disposed near to, one or more laser sensitizers. These laser sensitizers could be any number of absorber, pigment, or dye, which would absorb at least a portion of the laser wavelength used for patterning. The sensitizer may heat up due to absorption of the laser, and at least a portion of the heat may be transferred to the MOF, which may improve the efficiency of the laser patterning process.

Lasers used for patterning of a MOF may include many types of commercially available lasers, including mid-infrared lasers (such as carbon dioxide lasers, with wavelength typically in the 10,000 nm range), near-infrared lasers (such as Nd:YAG or similar laser, with wavelength typically in the 1,000 nm range), visible lasers, and UV lasers (including excimer lasers). Lasers could be solid-state, gas-phase, solution-phase, or fiber lasers. The lasers may display a continuous output, or could display pulsed output. The pulse duration may range from infinite in the case of continuous output, all the way down to femptosecond pulses. Peak power for laser pulses may range from zero up to gigawatts.

By using a thermal input for writing or patterning on the MOF materials, the reflected wavelength of given regions can be selectively modified. By providing different levels of thermal input to different regions of the MOF material, the reflected wavelength of the MOF can be tuned to multiple, controlled colors. By using a write-on-demand writing system such as a thermal printer or laser writing system, multiple colors may be written into the material in a single printing/patterning pass.

In certain cases, a commercially available thermal printer or laser writing machine may be used to pattern the herein described MOFs. In this case, the existing software may be used, in which one could modify the greyscale level, and/or the writing speed and/or other parameters, in order to transfer different amounts of heat to the MOF and generate different extents of spectral shift.

In other cases, thermal patterning machines might be specifically adapted to specific properties of given MOFs. For example, a machine might be developed or adapted, which applies a higher heat than typical machines. By the same token, a MOF might be developed that has a higher thermal threshold, matching said specifically adapted machine. The result would be a material which might be unable to be patterned using commercial, readily available machines, thereby providing a greater security and greater prevention of counterfeiting.

In yet other cases, sensor probes within thermal patterning machines might probe certain aspects of the MOF, such as characteristics of reflectivity, to confirm that the material is authentic, further increasing the security of the process.

In some embodiments, the materials may be subjected to more than one heat patterning step, by the same or different machine.

A variety of other layers may be provided on the exterior or interior of the MOF in order to provide it with beneficial properties. For instance, the MOF may be disposed on a substrate, which might be flexible or rigid. Flexible substrates may include plastic substrates such as polyester, polypropylene, polyethylene, polyamide, polyimide, or other such substrates as known in the art, as well as paper and other fiber-based non-wovens, in addition to metal foils. Rigid substrates might include glasses (silica, fluoride glasses), ceramics, and rigid metal surfaces.

It may have a protective or insulating coating/varnish disposed on its outer surface, or on its base surface, which may serve to stabilize it during the thermal patterning process. It may comprise any number of outer or inner layers, which may serve as chemical, physical, or other barriers, or may have an optical function. Onto the MOF might be integrated optical layers with transparency to a writing laser wavelength, or with particular laser light absorption properties.

In some cases, the thermal writing system may also change other properties of the MOF, including but not limited to surface finish (matte, glossy, etc.), surface texture/angle, scattering, haze, etc. In a particular form, certain patterned regions may have a different surface angle due the printing process (for instance, due to the particular shape of a thermal printing head, or to a surface texture caused by application of heat), which would result in these regions reflecting light in a different direction than unpatterned regions.

Using the present MOF in conjunction with a thermal patterning system allows the printing of a variety of different features, including, but not limited to: photographs, portraits, alphanumeric characters, fine lines, guilloche, rainbows (gradual color changes over a surface), barcodes (1D, 2D), logos, caricatures, cartoons, diagrams, and the like. In some forms, the patterned or unpatterned thermally reactive MOF may be exposed to a stimulus in order to partially or fully fix the structure in place such that further tuning by heat is partially or fully inhibited. The stimulus may include heat, UV, cold, gamma radiation, electron beams, specific chemicals, IR, gases, solvent, actinic radiation, chemicals, pressure, compression or other stimuli. Specific species may be included within the layered structure, which might react, crosslink, or fix upon exposure to a particular stimulus. These might include: Functional polymers, monomers, crosslinkers, polymerization initiators, inorganic species, reactive groups, radical species, ionic species, and more. In one example, a polyacrylate monomer and UV radical initiator are introduced into the layered structure as components of the final deposited layer of the structure. Following thermal patterning of the structure, the material is exposed to UV radiation, which polymerized the polyacrylate monomer, thereby forming a cross-linked network which holds the structure in place and causes it to be unreactive to further thermal stimulus.

In some forms, a secondary material may be introduced into the residual pore space of a thermally patterned or unpatterned thermally reactive MOF to eliminate at least some of the residual pore space. The secondary material might be an adhesive, polymer, coating, protective layer, molten solid, curable monomer/crosslinker, or more. Upon infiltration of this species into the void space of a given layer, the optical thickness of this layer will increase due to an increase in refractive index (replacing air, with a refractive index of 1, by a material of refractive index greater than 1). If both layers contain porosity, both layers may be infiltrated thereby causing a relatively larger effect. If only one layer contains porosity, this layer may be infiltrated thereby causing a relatively smaller effect. If the porosity has been completely collapsed during the thermal tuning process, introduction of a secondary species would have no effect on optical properties. These cases are illustrated schematically in FIG. 8. In a specific example, a thermally reactive MOF is thermally patterned/printed, and subsequently laminated onto a substrate using an adhesive. Provided this adhesive can flow (pressure-sensitive adhesives may flow at room temperature, whereas hot-melt adhesives might require heat to activate and become fluid), the adhesive may infiltrate the residual void space, which would cause a red-shift in reflected wavelengths for regions containing residual porosity, to a degree proportional to the extent of residual porosity. This secondary material may be further solidified to impart a greater degree of permanence or reduced responsiveness to further heat input to the structure. Solidification may occur due to cooling of a melt, crosslinking via heat, UV, or reactive components, drying, or other means as known in the art.

Figure 8:
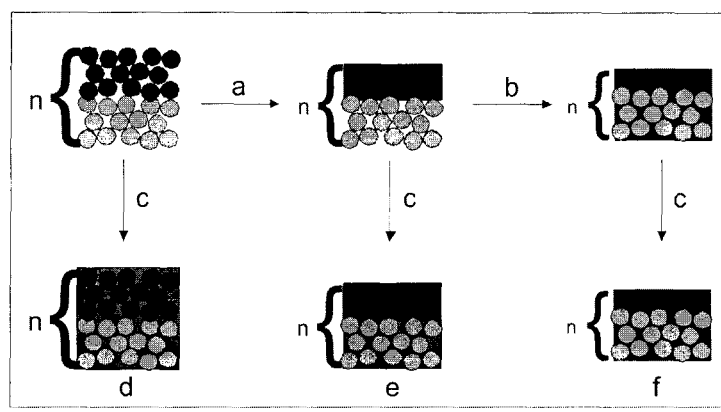
FIG. 8 illustrates MOFs with different amounts of porosity (top) infiltrated by a secondary material (bottom).

In FIG. 8 there is shown a structure with porosity in both alternating layers might be heated such that porosity collapses in the particle layer (a). Further heating could cause the material to melt and flow into the pores of the second porous layer (b). Infiltrating these structures with a fluid species would cause an increase in optical thickness in both layers (d), one layer (e), or would give no change in the case of the non-porous structure (f).

In some embodiments, the described materials may display a relatively specular (mirror-like) reflection, if for example they are formed on a flat and smooth substrate. In other embodiments, the described materials may display a relatively diffuse reflection. This may occur if the materials are disposed onto a rough surface where this roughness may cause scattering, or if a diffusive coating or film is applied to the top surface of the material.

Tunable MOF as Optically Variable Material

Examples of the disclosed methods, systems, materials and assemblies that may be useful in applications for security, authentication, and brand protection, as well as applications in graphic arts, and printing in general are described hereafter.

One of the features of MOFs is an angle-dependent coloration, such that the reflected wavelength range changes depending on the angle of the incident light with respect to the MOF surfaces, as previously described. Angle-dependent color reflection is a key feature in advanced security devices as used in banknotes, passports, ID documents, and other documents of value. The disclosed MOF materials display angle-dependent color reflection, thereby making them useful security materials. Furthermore, if multiple colors are written into the material using an appropriate thermal writing system, each of the resulting colors would display its own characteristic color-shift, with unique starting color, ending color, and color-travel range.

In some forms, more than one layer of MOF may be employed in an application. These layers may be disposed on the same or opposite sides of a substrate, or may be on separate regions of the substrate, or different substrates altogether. By orienting the layers in an appropriate way, the reflection/transmission characteristics may be combined to give new colors or optical effects.

In some forms, the features may be employed in reflection. In other forms, the features may be employed in transmission. The colors in reflection and transmission may be complimentary, as previously described.

In some forms, underlying substrate or article may have a relatively dark color, such that the reflection colors are more visible. In some forms, the underlying substrate or article may have a relatively light color, such that transmission colors are reflected from this surface and are visible to the user. In some forms, the underlying substrate or article may have a color which is complimentary or contrasting to at least a portion of the MOF. In some forms, the underlying substrate may have a transparent or translucent portion, allowing the MOF to be viewed in transmission by locating it between a light source and the observer.

In some forms, the MOF material may be patterned such that certain regions of the material reflect visible wavelengths at a particular angle, while other regions reflect invisible wavelengths at the same angle (for instance, UV or IR). This would then give the impression that colored material is locally printed in certain regions of the surface, whereas in actuality the material may be homogenously applied to the whole surface.

Examples of the disclosed MOFs may be useful as security and authentication markers in products and documents, for example, as well as in other applications. Examples of typical products requiring security features include: banknotes, passports, tax/excise stamps, product labels, ID cards, financial cards, and other such items.

In some embodiments, the described materials may be used for $1^{st}$ level authentication by eye, without tools required. In other embodiments, the described materials may be used in conjunction with some equipment to provide machine-readability ($2^{nd}$ level features). In other embodiments, the described materials may provide some features only readable by machine, or by forensic analysis.

In some embodiments, thermal patterning of the herein described MOFs may result in arbitrary graphics incorporating multiple-colors of color-shift material on the same substrate, patterned in perfect registry due to the single patterning step, with no consumables required. This property may provide an improved security to the underlying article or product.

In some forms, the disclosed MOFs may be used in combination with other security features known in the art. As an example, the disclosed MOFs may be used in conjunction with a UV-fluorescent dye or pigment. In one embodiment, the MOF is integrated on top of a layer containing a UV-fluorescent dye or pigment. By thermally printing certain regions of the MOF such that they reflect UV light, said regions would block at least a portion of any UV light incident on the fluorescent dye material. In this way, these regions would receive less UV light, and would fluoresce at a lower intensity than regions not shielded by UV-reflective material, thereby providing a fluorescence pattern upon UV irradiation.

In other forms, the thermally printed MOF would not block the absorption of UV radiation, but certain regions might instead reflect the radiation emitted from the UV fluorescent dye. In these regions the fluorescence reaching the users eyes would be diminished, giving the impression of patterned fluorescence.

MOFs may also be used with, and may interact with, other types of known security features/processes, including color-shifting inks or films, holograms, kinegrams, diffractive features, interference features, intaglio print, standard print, transparent regions, polymer or paper substrates.

A write-on-demand printing system in combination with the disclosed MOFs may be particularly useful in securing variable data such as serial numbers, ID portraits, signatures, fingerprints, issuance/expiry dates, and other data.

In a particularly relevant example, the MOFs as described may be used to image a human portrait, which is particularly useful for ensuring the authenticity of ID documents, since a color-shifting portrait could be used as a verification of the primary portrait (printed using standard inks). Human portraits may be printed in a number of ways into a MOF material as described. The portrait may be printed as a positive image, as a negative image, or as a false-color or false-greyscale representation. A portrait, initially from a photograph or drawing, may be manipulated with any number of standard graphic manipulation tools/software as known in the art in order to modify contrast, coloration, or any number of other image properties. In some cases, the portrait perception in reflection and transmission may be different, often with one appearing as a negative image, the other as a positive image. Changes in contrast, as well as positive-negative inversion may occur when the angle of light incident on the materials changes. In some cases, the portrait or some portions of the portrait may appear invisible to the human eye at some angles (due to peak reflectivity in the UV or IR ranges), but may become visible upon changing the angle. Further information, and illustration of some of these effects, can be found in the examples, in particular Examples 14 and 15. Further information on color perception can be found in: Color Perception: Physiology, Processes and Analysis (Neuroscience Research Progress Series); P. Matikas, Nova science publishers, 2009, 286 pages. The different optical effects noted here for portraits may also apply to other graphics which are not portraits.

In some forms, the MOF materials could be patterned at a sufficiently small scale such that the spots of different color would not be differentiable by human eye. The human eye would then mix these different spots, creating color combinations which may not be achievable if thermally patterning a single color. Two or more colors could be used in conjunction to artificially create a wider color palette. In a particular embodiment, the MOF material might be patterned with dots reflecting red, green, blue, and black, and might be used to create a full-color image using methods known in traditional printing ("halftoning" is the term typically used in printing). In another form, the MOF material might be patterned with dots reflecting cyan, magenta, yellow, and black, and might be used to create a full-color image using methods known in traditional printing. In a particular form, a full-color image is generated in order to give a true-color image at a particular angle. Upon tilting of this image, each of the printed colors would color-shift, thereby generating a false-color image, and effect which may be useful as a security feature.

As described above, in some forms, exposure to a temperature higher than the threshold temperature may result in complete loss of porosity in all the layers in the system, at which point exposure to further heat would have no influence on the optical properties of the stack. This property combined with halftoning may be used to increase the repeatability and reliability of patterning. In particular, where a patterning method uses a patterning temperature higher than the threshold temperature, the patterning may be performed in a binary fashion so that either no heat or a temperature above that threshold temperature is applied to any spot. As such, variations in appearance due to variation in the heat transferred during the patterning method or of the properties of the MOF may be reduced.

Figure 9:
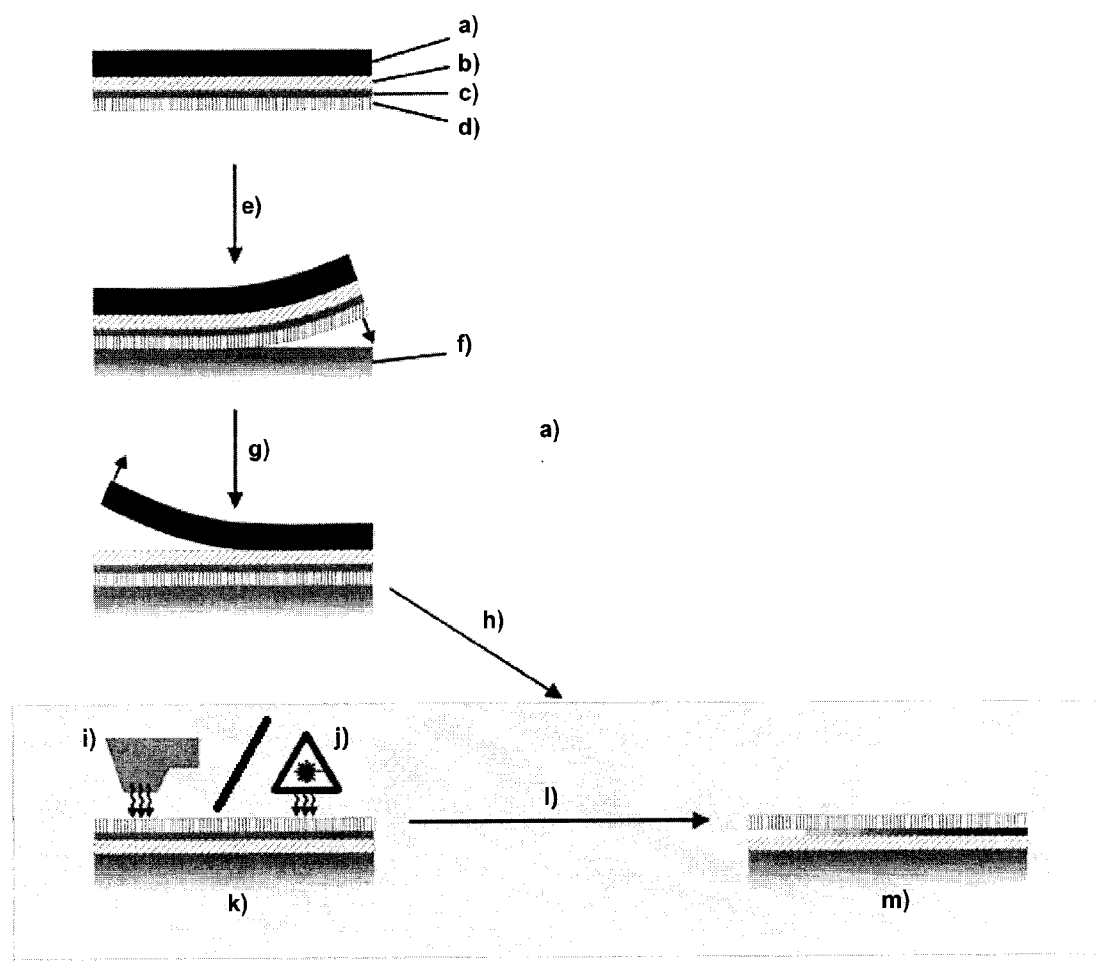
FIG. 9 illustrates a laminate containing a thermochromic MOF material, its application to a substrate, and subsequent heat patterning. a) Carrier (release) substrate, b) Varnish/protective coating, c) Thermochromic material, d) Adhesive, e) Lamination, f) Application surface, g) Removal of carrier, h) Print, i) Thermal printing, j) Laser writing, k) Apply varying amounts of heat to thermochromics material, l) Personalized/serialized printing, m) Color of thermochromics material shifts color proportionally to amount of heat applied.

In some forms, the thermally reactive MOFs may be included within a security laminate, which may comprise additional substrate, adhesive, varnish, protective coatings, diffusers, anti-glare coatings or other layers. Such a security laminate may be applied in whole or in part onto the surface of a document/product/etc using methods known in the art, including lamination, lamination transfer, or hot-foil stamping. Following application, a carrier/release substrate may be removed, leaving behind at least the MOF material, in addition to other layers such as, for example, adhesive, varnish, protective coatings, and interlayers. An example of a thermochromic laminate is illustrated in FIG. 9. As can be seen, the structure of this laminate may comprise a release substrate, onto which is deposited a varnish or protective coating, followed by the throchromic material, followed by an adhesive layer. This laminate may then be applied to an application surface, so that the adhesive causes bonding to the application surface. In some cases, the adhesive may require some stimulus to promote bonding, such as heat, pressure, UV, or others. Following bonding, the release substrate could be removed by peeling, with details such as peel strength, angle, and speed being important to the release process. This process would leave the MOF material adhered to the application surface with an adhesive, and protected by a varnish/protective coating. This deposited structure could then be exposed to a variable heat source, such as a thermal writing system or laser writing system, in order to thermally pattern the thermochromic material.

Optical layers such as diffusers, anti-glare, anti-reflection, and others, may be used to change the optical properties of the MOF and the change the observed optical properties at different angles. Diffusers, for example, may increase the viewing angle of a MOF by spreading out the otherwise mirror-like reflection characteristics. Optical layers are well known in the art, and a variety of these may be sourced from suppliers such as Edmund Optics, Jenoptik, and many more.

In some forms, the above described laminate may be applied to the entire surface of an intended product or document. In other forms, the above described laminate may be applied as a stripe over only a portion of the intended product or document. In other forms, the above described laminate may be applied as a discrete patch, using for example hot-stamping.

In some forms, the thermally reactive photonic crystal materials may be included within a security thread, which might be incorporated into a security paper using methods known in the art. In order to form a security thread, a MOF may be first deposited onto a substrate, such as a PET substrate. A second PET substrate may be bonded to the top surface of the MOF material, for instance using an adhesive. The PET-clad laminate could then be slit into the appropriate width ribbons, and fed into a paper machine to create a windowed-thread as known in the art.

In some embodiments, the MOF materials may be integrated into cards. In some cases, the MOF materials may be integrated into the card as a top laminate transferred using an adhesive (as described earlier). In other cases, the MOF material may be disposed (optionally using one or more adhesive layers) between two layers of card material, for example polycarbonate. The two layers of card materials may be fused together using heat and pressure, thus trapping the MOF material between them. The MOF material might be thermally patterned prior to the fusing process. Alternatively, the MOF material might be thermally patterned following the fusing process, for instance using a laser writing system to focus on the MOF layer within the stack.

In some forms, hot lamination might be achieved concurrently with thermal patterning. As an example, a thermal printer might be used to thermally activate the MOF material, which is disposed on a carrier and comprising a layer of thermally reactive adhesive (i.e. hot-melt adhesive). The printing step might activate at the same time a thermally-reactive adhesive (i.e. a hot-melt adhesive), and in so doing only particular regions of the material would be adhered onto the application surface. Upon removal of the carrier, only certain regions with activated adhesive might remain on the application surface, thereby generating a patterned deposition of MOF material.

In other forms, the thermally reactive MOF might be formed on a substrate, and subsequently removed from said substrate. Removal from the substrate could be achieved through shear, strain, de-bonding, or the use of a release coating or layer. The so-removed MOF material might then be comminuted into particle form, thereby generating a MOF pigment. Such pigments might then be formulated into a paint, ink, or other liquid vehicle using methods known in the art. (See WO 2012/162805). In some forms, an ink might comprise two or more different compositions of MOF pigment, which might lead to two of more thermal transitions, optical properties, or may generate mixtures of reflected wavelengths difficult to achieve with a single composition of MOF material.

In some forms, the MOF materials may be tuned prior to application to the surface or interior of a document/product/ etc. In other forms, the MOF materials may be tuned after application to the surface or interior of a document/product/ etc.

Method for Producing Tunable MOF

In one form, the thermochromic materials are generated by the iterative and alternating deposition of high and low refractive index layers. In another form, these layers are substantially flat, although a certain finite roughness may exist.

In some forms, the MOF may be deposited by alternating deposition of liquid layers, which are subsequently solidified to generate solid layers. The liquid layers may comprise a solid material which is in solution, dispersion, or suspension within a liquid solvent or combination of solvents. In this case, the solidification may proceed through drying of the liquid layer, to leave a solid layer behind. Drying (removal of the solvent) may be conducted through methods known in the art, for instance heating, air blowing, IR drying, or by any other suitable drying method. The liquid layer may contain one or more curable components, which may be cured during the process via exposure to heat, UV, IR, specific chemicals, or other suitable means to introduce additional bonding within the layer. For example, a liquid layer containing substantially no solvent may be deposited, and subsequently cured to transform it into a solid layer.

In some forms, a particle-containing layer is coated or printed from a liquid carrier. Particles may pack in different ways during coating and drying, depending on a number of factors in the liquid formulation, including: pH, surface groups on particles, van der Waals (difference in polarizability between particles and carrier), bridging polymers or molecules, repelling polymers (steric stabilization), electrostatic repulsions or attractions, rheological modifiers, or reactive species. Any such change may alter the way the particles pack together, and consequently may change the degree of porosity present between them, see for example FIG. 2. Some or all of these conditions may change as drying of the liquid formulation progresses. For instance, base stabilization may cause the particles to be relatively repulsive to each other, but evaporation may lead to loss of base, and thereby lead to attractive interactions between particles which may cause them to freeze in place, resulting in less dense layers with higher porosity. In addition, the process settings for coating and drying may influence the final structure and packing of the particles, including for example, drying speed, drying temperature, shear, web speed, air flow specifications, and ambient humidity. For example, relatively fast drying may result in coatings of particles having a relatively higher porosity due to insufficient time for the particles to fully densify. All of these settings can be selected based on the materials involved, the desired result and the utility.

Particles may be chosen for their thermally responsive properties, as previously described. Particles may also be notably chosen for their refractive index properties. Specifically, high refractive index materials (such as metal oxides like titanium dioxide, or metal sulfides such as zinc sulfide) are particularly advantageous to aid in increasing the refractive index contrast between layers, which leads to more efficient reflection of light for a given number of layers. Example materials with high refractive index include inorganic materials such as single or mixed metal oxides (such as titanium dioxide, zinc oxide, cerium dioxide, iron oxides, and others), single or mixed metal sulfides (such as zinc sulfide, lead sulfide), elemental and compound semiconductors (silicon, gallium arsenide, and others); and organic materials such as high-index polymers (such as sulfur and halogen-containing polymers), and certain organic crystals.

Particles of various inorganic materials, including numerous high refractive index materials, are available from suppliers such as Strem and Nanoamor. In addition, countless preparatory routes are described in the prior art.

Particles may include insulators, polymers (e.g., polystyrene or polymethylacrylate), metals, semiconductors (e.g., titanium oxide), silica, or combinations thereof. Other suitable materials include graphite, diamond, amorphous forms of carbon, C60, fullerenes, carbon nanotubes, silicon, silicon carbide, germanium, simple and complex binary and ternary metal oxides, metal chalcogenides, metal borides, metal phosphides, metal silicides, metal carbides, metal nitrides, iron oxide, tin oxide, antimony doped tin oxide, zinc oxide, and combinations thereof.

In some forms of the devices, the layers of polymer particles may be deposited in an alternating fashion with layers having a higher refractive index. This high refractive index layer may comprise components with a high refractive index, as are known in the art from the previously referenced patent publications. In a particular form, the high refractive index layer may be created by the deposition of a liquid containing a metal oxide material, such as titanium dioxide. The said metal oxide material may be contained in the liquid in the form of a solution, sol-gel, or particles. In a particular form, titanium dioxide particles are deposited from a dispersion in a solvent to form a solid layer after drying.

In a particular embodiment, a dispersion containing polymer particles dispersed in a solvent (which may be aqueous, or non-aqueous) is coated onto a substrate, and dried to give a layer containing polymer particles. Provided the polymer particles are not fusible at process temperatures, they might pack together such that pores naturally occur between them. The use of polymer particles is well documented, where a dispersion of polymer particles in an aqueous medium is normally called a latex, which are used in fields such as paints, finishes, coatings, health and beauty, and more (Reference: Film formation of lattices in Modern aspects of colloidal dispersions, Book, Ottewill et al., the entire disclosures of which are incorporated herein in its entirety). Onto a layer of polymer particles may then be coated a second dispersion containing metal oxide particles dispersed in a solvent (which may be aqueous, or non-aqueous), and dried, to give a layer containing metal oxide particles on top of the previous layer containing polymer particles. The two layers thereby provided may be substantially flat and separate, although a certain amount of interpenetration may occur. Following the deposition of the metal oxide-containing layer, further alternating layers of polymer particles and metal oxide particles may be deposited thereupon, in order to build up a stack to the desired number of layers.

In another form, the layered structure might begin with a metal oxide particles layer instead of a polymer particles layer. In another form, the first or last layer may comprise a composition different from the alternating high and low refractive index layers, with particular optical, mechanical, adhesion, reactive, or other properties. In another form, one or more layers having a different composition from the alternating high and low refractive index layers may be introduced between two or more of the alternating high and low refractive index layers. Such layers of different composition may have specific properties, including optical, protective, spacing, chemical, thermal conductivity, insulating, electrical, dielectric, or others, that may serve a functional or structural purpose.

In another form, liquid dispersions for fabricating the particles-containing layers might contain one or more coating components to influence the coating process, or which may be used to modify the optical, mechanical, adhesion, or other properties of the layers as known in the art. These coating additives may be selected from solvents, co-solvents, drying accelerators, drying inhibitors, curing agents, plasticizers, hardeners, fillers, surfactants, leveling agents, adhesion promoters, release aids, viscosity modifiers, rheology modifiers, refractive index modifiers, humectancts, bacteriostats, polymer binders, inorganic binders, molecular binders, coalescing aids, plasticizers, extenders, defoamers, colorants, pigments, matting agents, slip agents and the like. Specific components may be selected based on the desired properties of the device and its intended use. The choice of component would be apparent to those skilled in the art.

The content of coating components in the formulation relative to its total solids content may range from 0.001% up to 50%, more preferably from 0.01% up to 25%. The content of coating component may be quite important to the performance of a MOF: If the content is too high, the coating component may completely occupy the void space between fluidizable particles, thereby compromising the tunability of this layer. Logically, the amount of coating component would be limited to a level below the amount of void space in a layer: However, since the coating components may themselves influence the proportion of void space (through attractive interactions for example, as described below), a greater proportion may be allowed while still preserving void space.

In some form, one or more coating components may be added to the formulation, having a feature of causing attractive interactions between particles, through electrostatic, dipole, hydrophobic, conformation, hydrogen bonding or other equivalent interactions. For instance, a polymer binder having at least a partial charge might cause a bridging attraction to particles having at least a partial opposite charge. In another form, one or more coating components may be added to the formulation, having a feature of causing repulsive interactions between particles, through masking of electrostatic, dipole, hydrophobic, conformation, or other interactions, or through entropic stabilization. The attractive or repulsive interactions may be tuned through changes in formulation or conditions, and may change through the course of the manufacturing process.

Figure 10:
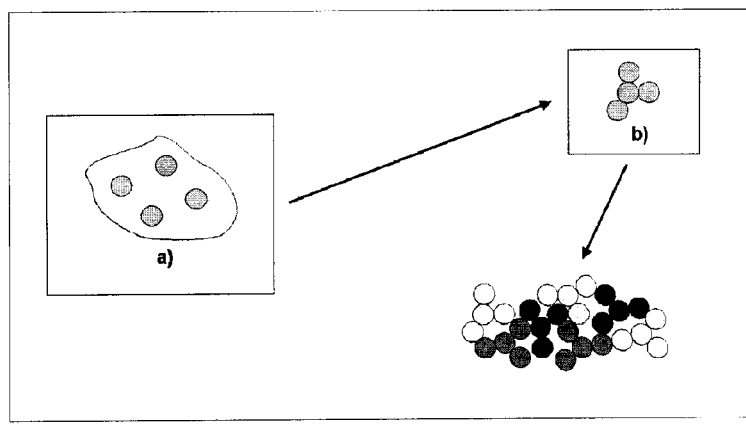
FIG. 10 illustrates particles in a carrier may form aggregates (top right), which may generate layers with increase porosity due to inefficient packing of these aggregates, at a) Dispersion of polymer particles in a carrier, and at b) Pre-aggregate.

In a particular embodiment, the particles may form pre-aggregates which may or may not be relatively stable. These pre-aggregates may further prevent the efficient packing of the particles, thereby resulting in a layer with higher porosity. The aggregation may occur in the initial liquid formulation spontaneously, or may be triggered by application of heat, cold, UV, or other suitable conditions. The aggregation may also occur during the coating process, or drying process (see FIG. 10).

The refractive index of either layer may be intentionally modified in order to provide with particular optical properties. For instance, a higher refractive index contrast might be preferable due to a greater net reflection (and therefore brighter reflection) from the materials. On the other hand, a lower refractive index contrast would result in narrower bands of wavelengths being reflected, which in some cases may be preferable since narrower reflected bands could result in purer perceptible colors. The refractive index of the low index layers may be increased by adding relatively higher refractive index components, or decreasing porosity, whereas the refractive index of the high index layers may be decreased by adding relatively lower refractive index components, or increasing porosity.

The layers within the layered material may be deposited through known coating/printing processes, including but not limited to: Slot-die, gravure, flexographic, screen, dip-coating, Meyer bar, k-bar, knife-over-plate, spray, plasma deposition, vacuum deposition, or other suitable coating/printing processes.

In some cases, the first or last layer deposited may comprise a composition different from the alternating high and low refractive index layers, with particular optical, mechanical, adhesion, reactive, or other properties. In another form, one or more layers having a different composition from the alternating high and low refractive index layers may be introduced between two or more of the alternating high and low refractive index layers. Such layers of different composition may have specific properties, including optical, protective, spacing, chemical, thermal conductivity, insulating, electrical, dielectric, or others, that may serve a functional or structural purpose.

In another form, the layered structure may have an even number of layers (i.e., same number of layers of the first material as the second material) or an odd number of layers. While any number of layers could be suitable, the greater the number of bilayers in the MOF, the greater the reflectivity of the resultant MOF, provided that the periodicity in the alternating layers is maintained (see Background section). Therefore, a balance might be struck between a suitable reflectivity, and the difficulty in manufacturing a greater number of layers. The layered structure may reflect any wavelength in the spectrum, including visible wavelengths, ultraviolet wavelengths, infrared wavelengths, or combinations thereof, and may shift between these ranges of wavelengths.

During fabrication of materials comprising alternating layers of high and low refractive index, wherein at least one of the layers contains voids, under some circumstances, the deposition of one layer may cause substantial loss in porosity of the previously deposited layers. In one form, the multilayer material is formed through the iterative deposition of polymer particles, and metal oxide particles. In this form, it is possible to provide two types of particles with substantially similar particle size, such that particles in a deposited layer are not able to infiltrate the voids in any of the previously deposited layers. If the particles are small enough to enter the void spaces of any of the previously deposited layers, the void volume of said layers may be reduced. It is preferable in this case to use a system whereby the deposition of a layer on top of a previously formed layer does not substantially reduce the porosity of the latter.

In some forms, more than one layer may be coated at a time, for instance by using techniques such as curtain coating or slide coating, which allow for the deposition of two or more liquid layers at one time onto a substrate, which are then solidified by drying and/or curing at a subsequent process step. In slide or curtain coating, multiple fluids are pumped separately into a multi-manifold die, and exit from a common die-lip as fluid layers in close proximity. The layers flow out from the die lip on top of each other in laminar flow conditions, such that they do not mix with each other. The stack of fluid layers is then converted to a stack of solid films via drying or curing. In this case, the fluid layers should have certain properties related to viscosity, surface tension, and thickness, in order to stabilize the "packet" of fluid layers being deposited together onto a substrate. Such considerations are well known in the art, more details can be found from die manufacturers such as Troller), or companies that provide simulation software for modelling single and multilayer coatings.

In some cases, the layers may be deposited one at a time, but one of more of the layers may be deposited onto the previous layer prior to the solidification of the previous layer (wet-on-wet coating), as known in the art.

In the present invention, a collapse in the interstitial void space of the constituent layers upon heating, results in a changing refractive index and geometric thickness for those layers. However, in addition to this change, because the layers may be comprised of fluidizable particles, upon heating, a fluid of these particles can penetrate into other layers in the MOF also changing the refractive index and/or geometric thickness of the layers and the corresponding optical properties of the MOF. In this way, the introduction of layers comprised of fluidizable particles increases the flexibility of thermal tunability of MOFs over the prior art. The use of fluidizable particles expands the range of possible tuning mechanisms over the prior art. In both WO 2012/162805 and WO 2009/143625, a collapse in the interstitial void space of the MOF's constituent layers upon heating results in a changing refractive index and geometric thickness for those layers. The collapse of one layer does not, by itself, affect the refractive index or geometric thickness of other layers in the structure.

The prior art is also limited in its usage of fluidizable particles as an additive to modify the thermal tunability of an MOF. For example, in WO 2012/162805, wax nanoparticles are disclosed as an additive embedded in the polymer material making up the MOF. In this way, the MOF may be provided with several different temperature thresholds. However, the tunability of a MOF made in this way is limited by the low proportion of fluidizable particles present. Because the refractive index and geometric thickness of a layer of a MOF may be approximated by a weighted volume fraction of the refractive index and geometric thickness of the separate constituents of that layer, the influence of the low proportion of fluidizable particles on the thermal tunability of the MOF is limited. The present invention represents a significant improvement because it employs fluidizable particles that provide interstitial void space. As a result, a much greater proportion of the MOF is tunable.

EXAMPLES

Example 1

Formation of a MOF Film A. A dispersion of titanium dioxide particles (Dispersion-1) is produced by grinding a titanium dioxide powder (such as AEROXIDE® $TiO_2$ P 25, produced by Evonik Corporation) in water using a media mill. The particle sizes in the Dispersion-1 range from 10-150 nm, and the solid content is adjusted in the range of 5 to 16 weight percent, depending on the desired film thickness (see below). A dispersion of polymer particles (Dispersion-2) in water (also called a "latex") is prepared through emulsion polymerization. The polymer is a co-polymer of methyl methacrylate, acrylic acid, and styrene monomers, stabilized in water with appropriate surfactants and co-solvents, as known in the art ((P. Lovell et al., *Emulsion Polymerization and Emulsion Polymers*, 1997 John Wiley and Sons)). The size of the resulting polymer particles is in the range of 10 nm to 150 nm. The solid content of Dispersion-2 is adjusted in the range of 5 to 16 weight percent, depending on the desired film thickness (see below). Due to the presence of high glass transition monomers in the copolymer, the particles in Dispersion-2 do not have film forming properties, meaning that the polymer particles will not undergo coalescence upon drying at room temperature. This is known in the art as a non-film-forming latex. Due to this, when a layer of Dispersion-2 is dried, the polymers particles (of roughly spherical shape), will pack together, leaving interstitial spaces between them.

Figure 11:
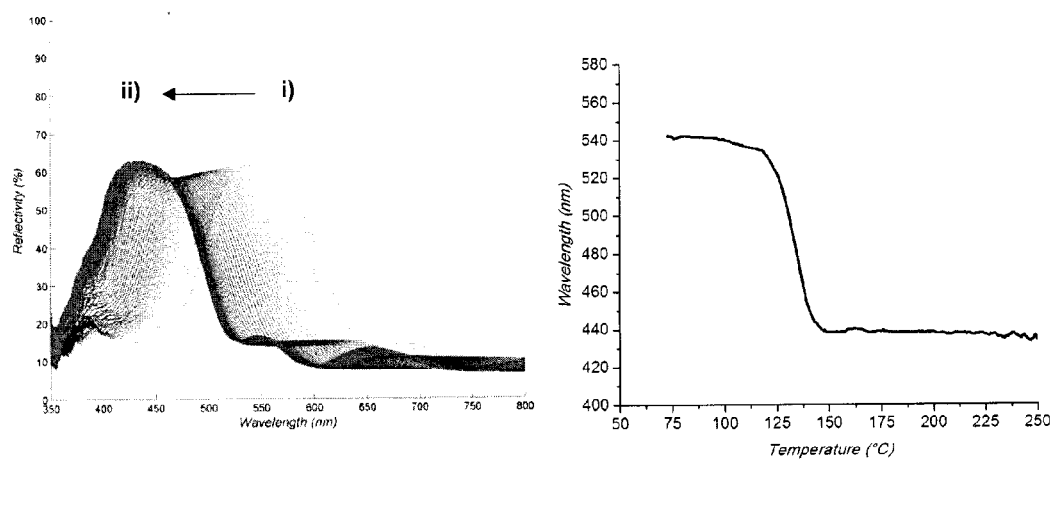
FIG. 11 illustrates reflectivity spectra (a) measured during heat activation of an MOF film A, and the position of peak maximum (b) plotted as a function of temperature, i) Before activation, and ii) After activation.
Figure 12:
FIG. 12 illustrates thermal melting of the polymer particles (black) in the MOF film A. a) Before activation, b) after activation.

To produce MOF film A, Dispersion-1 is coated onto a glass substrate by spin-coating (WS-650-15B Spin processor, Laurell technologies) by varying the solids content of the dispersion, as well as the rotational speed of the spin-coater (between 2000-10,000 rpm) in order to achieve a dry layer thickness in the range of 60 nm-150 nm. Following drying, a layer of Dispersion-2 is coated onto this first layer, using spin-coating, and dried to a dry layer thickness of 100 nm-300 nm (again, by controlling the solid content and spin speed). The deposition of Dispersion-1 and Dispersion-2 is carried out iteratively until the total number of layers reaches 13, to give MOF film A. The reflectivity spectra of MOF film A were recorded during the thermal activation between the range of 70° C. and 250° C. using an Ocean Optics USB4000 UV-Vis-NIR Fiber Optic Spectrometer (see FIG. 11a), while varying the base temperature of a ceramic hot plate on which is resting the MOF film A. The thermal profile of the MOF film A was then compiled by following the position (wavelength in nm) of the reflectivity peak maximum as a function of the temperature to which the film was exposed (see FIG. 11). The same Dispersion-1 and Dispersion-2 were coated as a bilayer, using the same spin-coating parameters, onto a silicon wafer. Refractive indexes and thickness of this Dispersion-1/Dispersion-2 bilayer are measured by spectroscopic ellipsometry before and after thermal activation (exposing the film for 30 seconds on a hotplate heated to 170 degrees Celcius), using a Sopra GES5E equipped with a EP-A accessory for iso-therm measurements. Spectra were recorded in the range of 3 to 4 eV in a rotating polarizer configuration. The porosity in each layer ($\phi_1$ and $\phi_2$ volume fractions of voids respectively in titania layer and latex layer) is calculated using the effective medium approximation of the Bruggeman model with $n_a$ refractive index of air ($n_a=1$) for layer constituted of particles and voids. (see FIG. 12) Other than air, the other constituents of the layer are polymer particles with $n_p$, refractive index of acrylate-styrene copolymer ($n_p=1.53$) and titania particles with $n_t$, refractive index of rutile anatase mixture ($n_t=2.5$). The following data was collected in this way:

| Before Thermal Activation | Thickness (nm) h | Refractive index at 633 nm $n_{eff}$ | Calculated porosity $\Phi$ |
|---|---|---|---|
| Layer2: "latex" | 139.9 | 1.37 | 29% |
| Layer1: "titania" | 67.4 | 1.97 | 24% |

| After Thermal Activation | Thickness (nm) h' | Refractive index at 633 nm $n_{eff}'$ | Calculated porosity $\Phi'$ |
|---|---|---|---|
| Layer2: "latex" | 84.9 | 1.53 | 1% |
| Layer1: "titania" | 71.4 | 2.05 | 1% |

It can be seen that during thermal activation of the materials, the porosities in both layers decreases noticeably, confirming the melting of polymer particles and collapse of porosity in the Dispersion-2 layer, as well as the infiltration of the melted polymer into the voids of the titania layer (Dispersion-1).

Example 2

Figure 13:
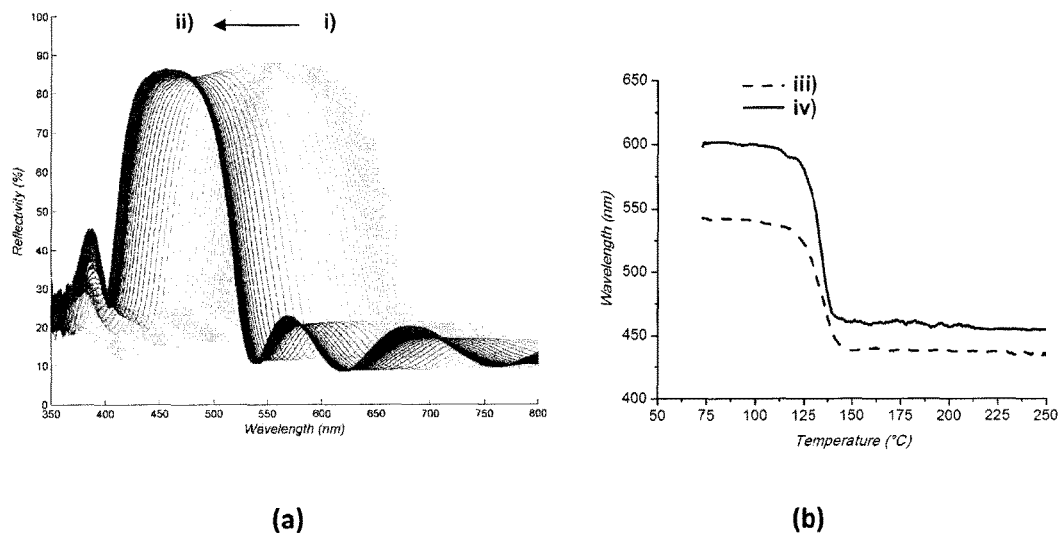
FIG. 13 illustrates reflectivity spectra (a) measured during heat activation of MOF film B, and position of peak maximum (b) plotted as a function of temperature. i) Before activation, ii) After activation, iii) MOF film A, iv) MOF film B.

MOF film B with increased degree of porosity. In a specific example, a MOF film B is prepared in the following way: A dispersion of polymer particles (Dispersion-3) in water is prepared through modified microemulsion polymerization. Microemulsion polymerization differs from emulsion polymerization by the amount of surfactant needed to stabilize the respective systems. Much more surfactant is needed for microemulsions, due to the necessity of stabilizing a large internal interfacial area. Microemulsion polymerizations produce thermodynamically stable lattices in the nanosize range (F. Pavel et al., *Microemulsion Polymerization*, Journal of Dispersion Science and Technology 2004, vol. 25, no. 25, p. 1). The polymer is a co-polymer of methyl methacrylate, acrylic acid, and styrene, stabilized in water with appropriate surfactants and co-solvents, as known in the art. The size of the resulting polymer particles is in the range of 10 nm to 150 nm. A dispersion in water of titanium dioxide particles (Dispersion-1 as in example 1) is coated onto a glass substrate using spin-coating to achieve a dry layer thickness in the range of 60 nm-150 nm (see previous example). Following drying, a layer of Dispersion-3 is coated onto this layer, using spin-coating, and dried to a dry layer thickness of 100 nm-300 nm. The deposition of Dispersion-1 and Dispersion-3 is carried out iteratively until the total number of layers reaches 13. The reflectivity spectra of the MOF were recorded during the thermal activation between the range of 70° C. and 250° C. using the same protocol as for Example 1 (see FIG. 13). The thermal profile of the thermochromic film was then compiled by following the position (wavelength in nm) of the reflectivity peak maximum as a function of the temperature to which the film was exposed. The same Dispersion-1 and Dispersion-3 were coated as a bilayer, using the same spin-coating parameters, onto a silicon wafer. The thicknesses, refractive indexes and porosities of each layer are measured and calculated using the same method as in Example 1:

| Before Thermal Activation | Thickness (nm) h | Refractive index at 633 nm $n_{eff}$ | Calculated porosity $\Phi$ |
|---|---|---|---|
| Layer2: "latex" | 165.1 | 1.34 | 35% |
| Layer1: "titania" | 79.0 | 1.92 | 27% |

-continued

| After Thermal Activation | Thickness (nm) h' | Refractive index at 633 nm $n_{eff}'$ | Calculated porosity $\Phi'$ |
|---|---|---|---|
| Layer2: "latex" | 90.8 | 1.51 | 3% |
| Layer1: "titania" | 79.2 | 2.03 | 2% |

Figure 14:
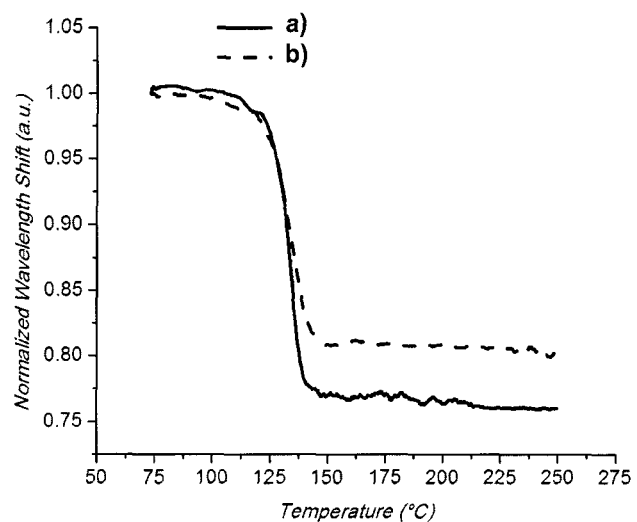
FIG. 14 is a comparison of the tuning range for MOF films A and B. a) MOF film B, b) MOF film A.

The porosities in each layer are increased compared to Example 1 (29% to 35% for the polymer layer, and 24% to 27% for the titania layer). In order to compare the thermal activation of MOF films A and B, the thermal profiles were normalized by the initial values before activation. It can be observed that the increase in porosity results in a greater spectral shift upon thermal activation for MOF film B (see FIG. 14).

Example 3

MOF film C with reduced porosity in titania layer. In an example, a thermochromic film is prepared in the following way: A dispersion of polymer particles (Dispersion-4, "latex") in water is prepared through emulsion polymerization. The polymer is a co-polymer of butyl acrylate, acrylic acid, and styrene, stabilized in water with appropriate surfactants and co-solvents, as known in the art. As well known in the art (J. Keddie et al, Fundamentals of Latex Film Formation—Processes and Properties, 2010 Springer), due to the presence of low glass transition monomer such as butyl acrylate in the copolymer (glass transition temperature −50 degrees Celsius), Dispersion-4 has film forming properties and will undergo coalescence and film formation during drying at room temperature. A dispersion in water of titanium dioxide particles (Dispersion-1 as in example 1) is mixed with Dispersion-4 in a weight ratio of 85/15, corresponding to a volume ratio of 60/40, to give Dispersion-5. Dispersion-5 is coated onto a glass substrate using spin-coating at appropriate rotational speed in order to achieve a dry layer thickness in the range of 60 nm-150 nm. Following drying, a layer of latex prepared according to example 2 (Dispersion-3) is coated onto this layer, using spin-coating, and dried to a dry layer thickness of 100 nm-300 nm. The deposition of Dispersion-5 and Dispersion-3 is carried out iteratively until the total number of layers reaches 13. The thicknesses, refractive indexes and porosities of each layer are measured and calculated based on a bilayer using the same method as Example 1:

| Before Thermal Activation | Thickness (nm) h | Refractive index at 633 nm $n_{eff}$ | Calculated porosity $\Phi$ |
|---|---|---|---|
| Layer2: "latex" | 154.5 | 1.36 | 32% |
| Layer1: "titania" mix | 60.0 | 1.97 | 5% |

| After Thermal Activation | Thickness (nm) h' | Refractive index at 633 nm $n_{eff}'$ | Calculated porosity $\Phi'$ |
|---|---|---|---|
| Layer2: "latex" | 94.2 | 1.52 | 1% |
| Layer1: "titania" mix | 66.5 | 2.00 | 2% |

Figure 15:
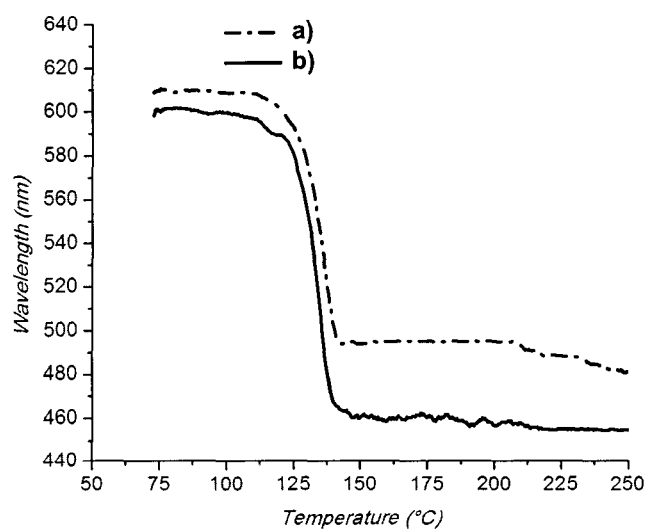
FIG. 15 is a comparison of the tuning range for MOF films B and C. a) MOF film C, b) MOF film B.

The porosity measured in the titania mixture layer is noticeably lower than example 2 with a reduction from 27% to 5%. As anticipated, the film forming polymer from Dispersion-4 is filling the interstitial space between titania particles. The porosity of the layer formed by Dispersion 3, however, remains similar (35% for example 2 and 32% in the case of example 3). The thermal profile of the 13 layer thermochromic film C on glass was then compiled by following the position (wavelength in nm) of the reflectivity peak maximum as a function of the temperature to which the film was exposed (see FIG. 15) using the same procedure as Example 1. By comparing with thermochromic film B from Example 2, it can be observed that the reduction in porosity in the titania layer results in a reduction of the spectral shift during thermal activation by limiting the void volume available for the polymer from the latex layer to flow and infiltrate the titania layer.

Comparative Example 1

Non-thermochromic MOF film D without porosit In a specific example, a non-thermochromic MOF film is prepared in the following way: A mixture of titania particle dispersion and film forming latex is prepared according to example 3 (Dispersion-5) and coated onto a glass substrate using spin-coating at appropriate rotational speed in order to achieve a dry layer thickness in the range of 60 nm-150 nm. Following drying, a dispersion of film-forming particles in water prepared according to example 3 (Dispersion-4) is coated onto this layer, using spin-coating, and dried to a dry layer thickness of 100 nm-300 nm. As it is well known in the art, a film-forming latex will dry into a uniform polymer thin film with minimum porosity. The deposition of Dispersion-5 and Dispersion-4 is carried out iteratively until the total number of layers reaches 13. The thicknesses, refractive indexes and porosities of each layer are measured and calculated using the same method as example 1:

| Before Thermal Activation | Thickness (nm) h | Refractive index at 633 nm $n_{eff}$ | Calculated porosity $\Phi$ |
|---|---|---|---|
| Layer2: "latex" | 127.2 | 1.50 | 5% |
| Layer1: "titania" mix | 86.7 | 1.95 | 7% |

| After Thermal Activation | Thickness (nm) h' | Refractive index at 633 nm $n_{eff}'$ | Calculated porosity $\Phi'$ |
|---|---|---|---|
| Layer2: "latex" | 114.1 | 1.50 | 5% |
| Layer1: "titania" mix | 91.6 | 2.01 | 1% |

Figure 16:
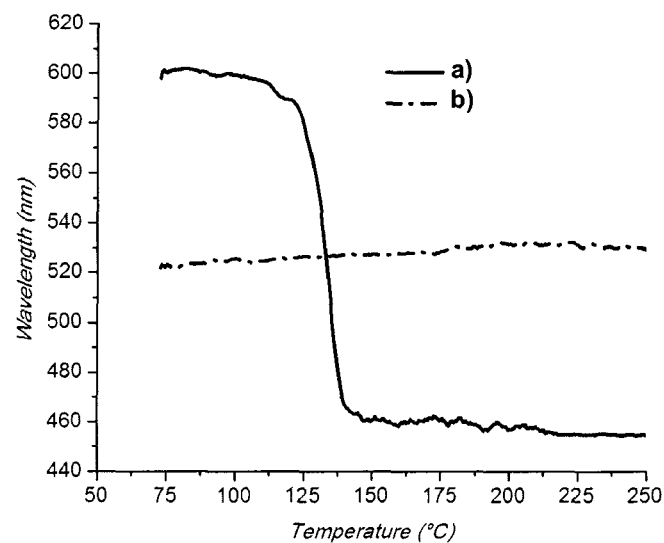
FIG. 16 is a comparison of the tuning range for MOF films B and D. a) MOF film B, b) MOF film D.

A low porosity is observed in both titania and latex layers. The thermal profile of the 13 layer non-thermochromic film D on glass was then compiled by following the position (wavelength in nm) and the reflectivity value (in percentage) of the peak maximum in reflectivity as a function of the temperature to which the film was exposed (see FIG. 16) using the same procedure as Example 1. As can be seen, no significant spectral shift upon heating is observed. The absence of porosity in both layer results in a thermally non-reactive film where no pores in the latex layer will collapse by melting of the polymer, and where no polymer from the latex layer will flow and infiltrate the limited pore space in the titania layer.

Example 4

Figure 17:
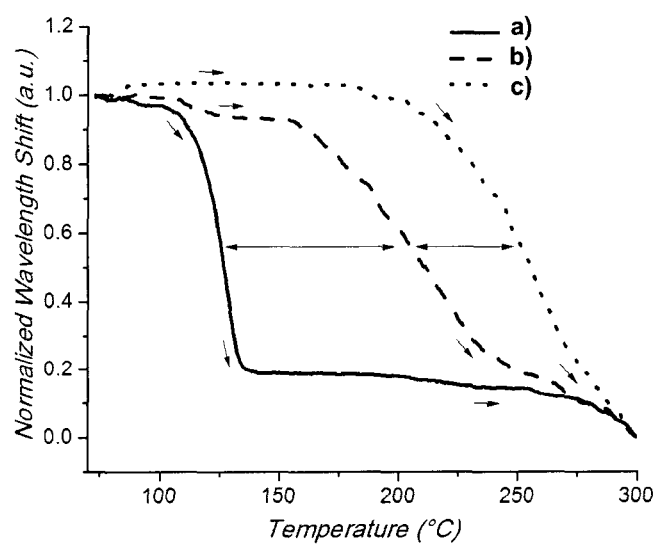
FIG. 17 is a comparison of the tuning range for MOF films E, F, and G. a) MOF film E, b) MOF film F, c) MOF film G.

Preparation of MOF films with increased temperature threshold. In a specific example, 3 MOF films (E, F and G) are prepared in the same way as described in Example 2. After alternatively coating titania and latex layers to reach a total of 13 layers, two of the three thin films are coated using spin-coating technique with a solution of polyaziridine crosslinker (Witcolink PZ-33 from Witcobond) in water, using a 2% weight solution for MOF film F, and a 5% weight solution for MOF film G. After drying, the MOF films F and G are cured overnight at room temperature. The MOF film E was prepared in the same way as example 2 and MOF film B. The MOF film F and G in contrast, were partially crosslinked using the polyaziridine crosslinker, which can react with the acrylic acid functionalities in the polymer particles. The thermal profiles of each MOF film was then recorded by following the position (wavelength in nm) of the peak maximum in reflectivity as a function of the temperature to which the films were exposed using the same procedure as previous examples. After normalization of the initial and final values of the peak maximum in reflectivity for each thermal profile it can be seen that temperature of activation for MOF films F and G have increased (see FIG. 17). While the threshold temperature of MOF film E (comparable to thermochromic film B) is around 120° C., MOF film F undergoes color shift around 150° C., and MOF film G around 200° C. The temperature threshold is therefore controlled by the degree of crosslinking in the thin film. The more crosslinker is incorporated in the thin film, the higher the temperature threshold, since increased crosslinking inhibits polymer mobility.

Example 5

Figure 18:
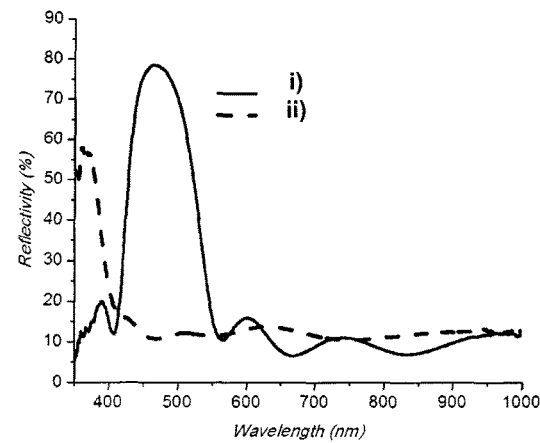
FIG. 18 illustrates the reflectivity spectra before and after thermal activation for MOF films H, I, J and K. i) MOF film H before activation, ii) MOF film H after activation, iii) MOF film I before activation, iv) MOF film I after activation, v) MOF film J before activation, vi) MOF film J after activation, vii) MOF film K before activation, viii) MOF film K after activation.
Figure 18:
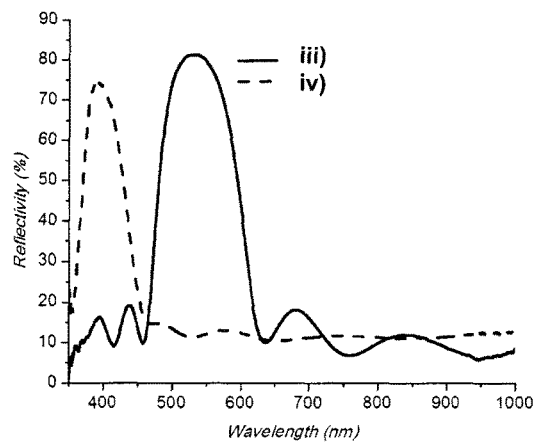
Figure 18:
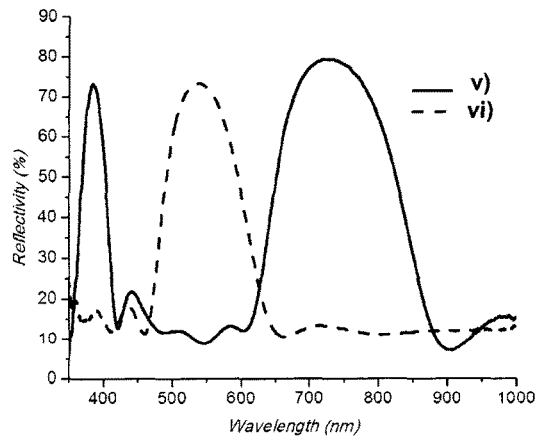
Figure 18:
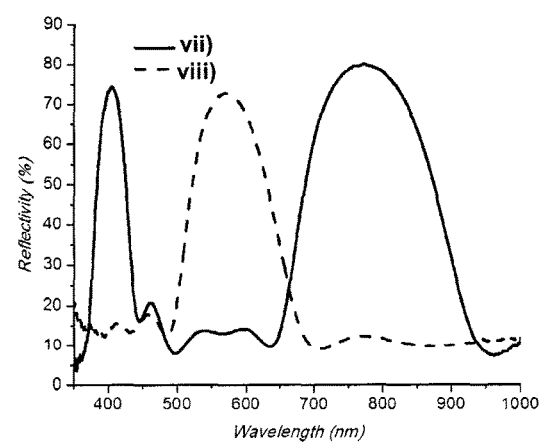

Preparation of MOF films (H, I, J and K) with different color ranges. In a specific example, MOF films with 4 different colour ranges are prepared in the same way as described in Example 2. For the MOF film H a dry layer thickness in the range of 50 nm is targeted for the titania layer and a dry layer thickness in the range of 100 nm is targeted for the latex layer. For MOF film I a dry layer thickness in the range of 55 nm is targeted for the titania layer and a dry layer thickness in the range of 110 nm is targeted for the latex layer. For the MOF film J a dry layer thickness in the range 80 nm is targeted for the titania layer and a dry layer thickness in the range of 180 nm is targeted for the latex layer. For the MOF film K a dry layer thickness in the range 90 nm is targeted for the titania layer and a dry layer thickness in the range of 190 nm is targeted for the latex layer. The reflectivity spectra of the 4 different MOF films were recorded before and after thermal activation (exposing the film for 30x seconds on a hotplate heated to 170y degrees celsius) using an Ocean Optics USB4000 UV-Vis-NIR Fiber Optic Spectrometer (see FIG. 18). MOF film H has a violet color before activation (peak of maximum reflectivity at 465 nm) and becomes transparent after activation (peak of maximum reflectivity in the ultra-violet range <350 nm). MOF film I has a green color before activation (peak of maximum reflectivity at 530 nm) and becomes transparent after activation (peak of maximum reflectivity in the ultra-violet range at 400 nm). MOF film J has a red color before activation (peak of maximum reflectivity at 730 nm) and becomes green after activation (peak of maximum reflectivity at 550 nm). MOF film K is transparent before activation (peak of maximum reflectivity in the infrared range at 780 nm) and becomes yellow after activation (peak of maximum reflectivity at 580 nm).

Example 6

MOF film L having primary reflection peak in the infrared and secondary resonance in the visible range. In a specific example, a thermochromic film is prepared following the same procedure used in Example 2. The dry thicknesses in this thermochromic film L are targeted at 120 nm for the titania layer and 280 nm for the latex layer. The thicknesses and refractive indexes of each layer are measured based on the same method as example 2:

| Before Thermal Activation | Thickness (nm) h | Refractive index at 633 nm $n_{eff}$ |
|---|---|---|
| Layer2: "latex" | 278.0 | 1.41 |
| Layer1: "titania" | 127.0 | 1.94 |

| After Thermal Activation | Thickness (nm) h' | Refractive index at 633 nm $n_{eff}'$ |
|---|---|---|
| Layer2: "latex" | 189.0 | 1.48 |
| Layer1: "titania" | 113.0 | 1.97 |

Figure 19:
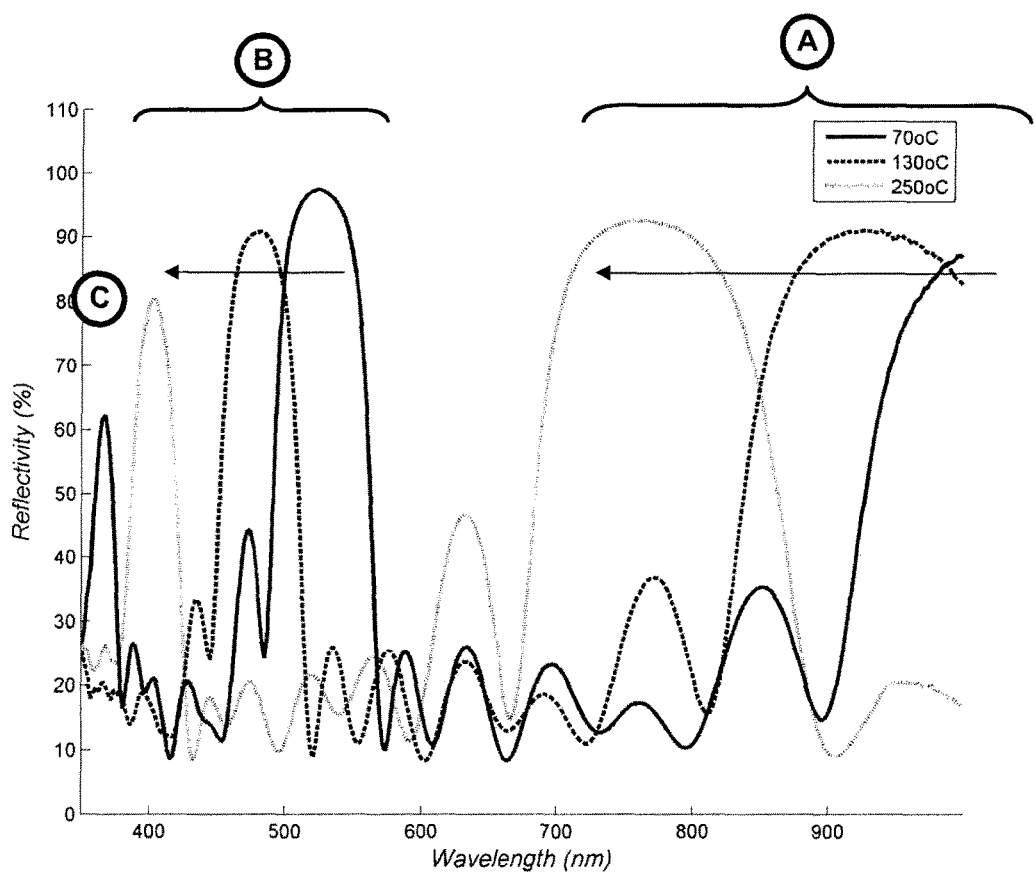
FIG. 19 illustrates the reflectivity spectra of MOF film L during thermal activation.

The reflectivity spectra of the thermochromic film L was recorded at 3 different temperatures during the thermal activation: at 70° C. (before color shift), at 130° C. (during the color shift) and at 250° C. (after color shift) using the same procedure to record thermal profile as in example 2 (see FIG. 19). It can be seen that before activation (at 70° C.) the first-order reflection peak (peak A) is located in the infrared region (maximum peak of reflectivity higher than 1000 nm). While this first-order peak is in the invisible range, the peak corresponding to the second-order resonance (peak B) is located in the visible range at 550 nm, resulting in a yellow-green color. During activation (at 130° C.) both peaks are starting to blue-shift towards lower wavelength: the primary peak A is traveling towards the visible range and the secondary peak B is travelling towards the invisible ultraviolet range. After activation the MOF film L is transparent with both peaks in the invisible range (A peak at the lower limit of the infrared region 760 nm and peak B at the upper limit of the ultraviolet range—400 nm). Peak C, present only before activation, is a third-order resonance and disappears after thermal activation.

Example 7

MOF film M having first-order reflection peak in the infrared and higher-order resonance in the visible range. In a specific example, a MOF film is prepared following the same procedure used in Example 6. The dry thicknesses in these MOF film M is targeted at 200 nm for the titania layer and 300 nm for the latex layer. Thicknesses and refractive indexes were measured using the same procedure as previous example:

| Before Thermal Activation | Thickness (nm) h | Refractive index at 633 nm $n_{eff}$ |
|---|---|---|
| Layer2: "latex" | 296.0 | 1.36 |
| Layer1: "titania" | 196.0 | 1.87 |

| After Thermal Activation | Thickness (nm) h' | Refractive index at 633 nm $n_{eff}'$ |
|---|---|---|
| Layer2: "latex" | 124.0 | 1.48 |
| Layer1: "titania" | 196.0 | 2.03 |

Figure 20:
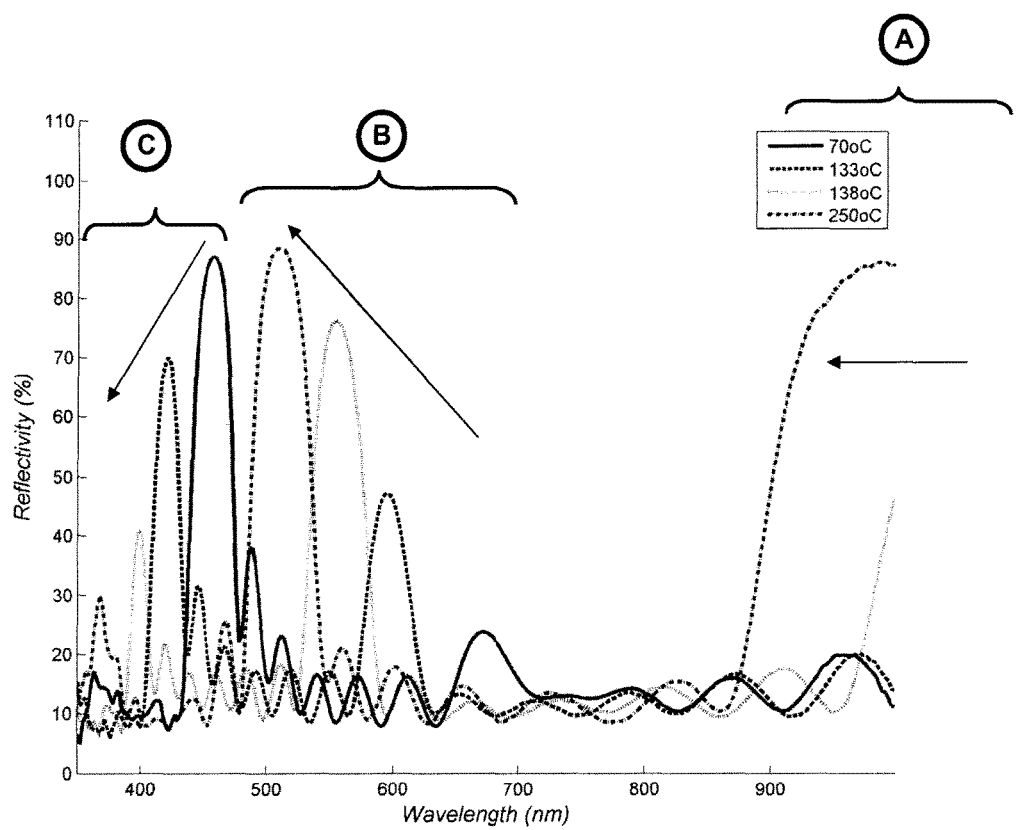
FIG. 20 illustrates the reflection spectra recorded during thermal activation of MOF film M.

Reflectivity spectra were recorded at 4 temperatures during activation (70° C., 133° C., 138° C. and 250° C.) using the same procedures as previously, with results shown in FIG. 20. Before thermal activation, the layers 1 and 2 have similar optical thicknesses, and the f-ratio for this stack is 0.48. At this f-ratio, it is expected that the reflectivity of the second-order peak is low, and the reflectivity of the third-order peak is high, which can be seen in FIG. 20. Upon thermal activation, however, the latex layer reduces greatly in optical thickness, while the titania layer slightly increases. The f-ratio for the thermally activated stack is 0.31, for which we would theoretically expect the second-order peak to be much more prominent, and the third-order peak to be reduced in intensity, exactly what is observed in FIG. 20. This confirms that appropriate design and control of the f-ratio in a MOF can be used to accurately control the reflected color states.

Example 8

Figure 21:
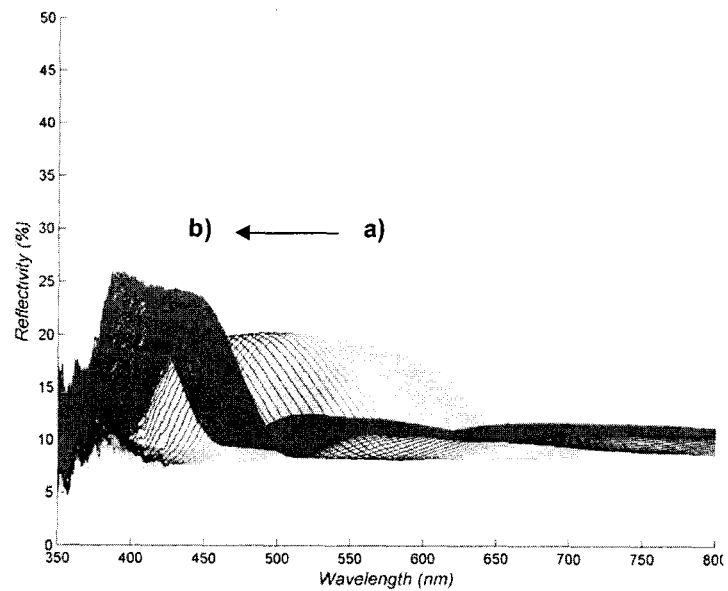
FIG. 21 illustrates the thermal activation of MOF film N. a) Before activation, b) After activation.

MOF film N having alternative high-refractive index layers. In one example, a MOF film is prepared in the following way: A dispersion of polymer particles is prepared according to example 2 (Dispersion-3). A dispersion in water of cerium dioxide particles ("ceria") with the particles size in the range of 10 nm-50 nm (Dispersion-6, NANOBYK™-3810 from BYK) is first coated onto a glass substrate using spin-coating at appropriate rotational speed in order to achieve a dry layer thickness in the range of 50 nm-100 nm. Following drying, a layer of Dispersion-3 is coated onto this layer, using spin-coating, and dried to a dry layer thickness of 100 nm-300 nm. The deposition of Dispersion-6 and Dispersion-3 is carried out iteratively until the total number of layers reaches 13. The reflectivity spectra of MOF film N were recorded during the thermal activation between the range of 70° C. and 250° C. using an Ocean Optics USB4000 UV-Vis-NIR Fiber Optic Spectrometer (see FIG. 21). The lower refractive index of cerium oxide ($n_c$=2.2) compared to titania results in a lower reflectivity for the MOF film N than for MOF films in previous examples.

Example 9

Figure 22:
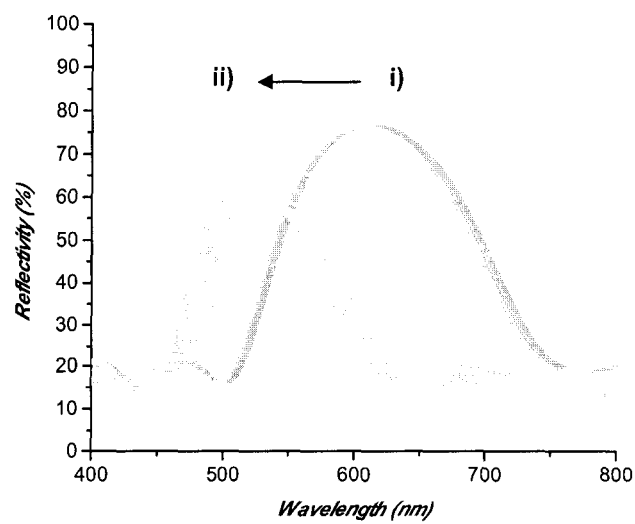
FIG. 22 illustrates the thermal activation of MOF film O prepared using roll-to-roll coating. i) Before activation, ii) After activation.

Production of MOF film O using roll-to-roll coating process. In a specific example, a MOF film O is prepared in the following way: A dispersion of polymer particles is prepared according to example 2 (Dispersion-3). A dispersion in water of titanium dioxide particles is prepared according to example 1 (Dispersion-1). Dispersion-1 and Dispersion-3 are then formulated with appropriate non-ionic surfactant level to achieve a surface tension of below 35 Dynes. Dispersion-1 is first coated onto a 5 mil polyester substrate (Melinex ST504™ from Dupont Teijin Film™) on a roll-to-roll process at a speed of 5 m/min, using a reverse Microgravure™ coating equipment (µCoater 350 from Yasui Seiki), at a wet coat thickness in the range of 5 µm-11 µm (microgravure roll mesh at 120 lines/in) in order to achieve a dry layer thickness in the range of 60 nm-100 nm. Following drying in the dryer unit set at 130° C., a layer of Dispersion-3 is coated onto this first layer, using the same roll-to-roll coating configuration in a second pass at a web speed of 5 m/min, and dried to a dry layer thickness of 100 nm-300 nm. The deposition of titania and latex is carried out iteratively until the total number of layer reaches 9 layers. The resulting MOF film O displays a yellow-orange colour before thermal activation at specular angle (peak maximum in reflectivity at 675 nm wavelength) and blue-green at lower angle of reflection. The reflectivity spectra of the MOF film were recorded while the film was exposed to various temperatures between the range of 60° C. and 140° C. using an Ocean Optics USB4000 UV-Vis-NIR Fiber Optic Spectrometer (see FIG. 22). The MOF film after activation displays a blue-green color at specular angle and a purple colour at lower angle of reflection.

Example 10

Figure 23:
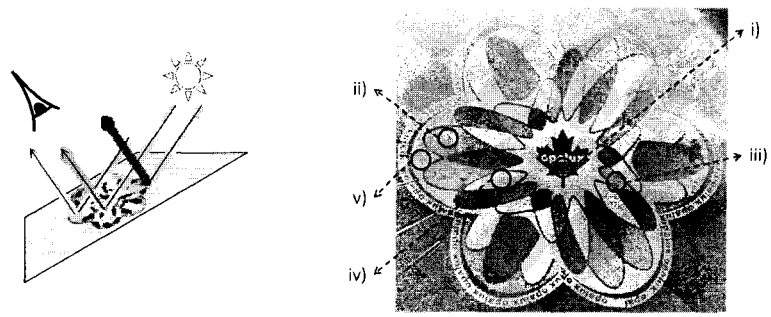
FIG. 23 illustrates a multicolor graphic printed onto MOF film P viewed in reflection (a), same graphic printed onto standard thermal paper (b), and reflectivity spectra for selected printed regions of MOF film P (c). i) Zone A—Non printed (white)—Red color film; ii) Zone B—Printed (Gray-1)—Orange color film; iii) Zone C—Printed (Gray-2)—Golden color film; iv) Zone D—Printed (Gray-3)—Yellow color film; v) Zone E—Printed (Black)—Green color film.
Figure 23:
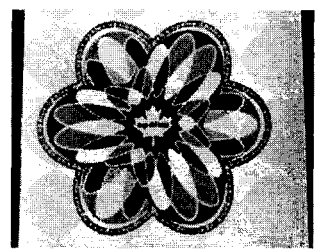
Figure 23:
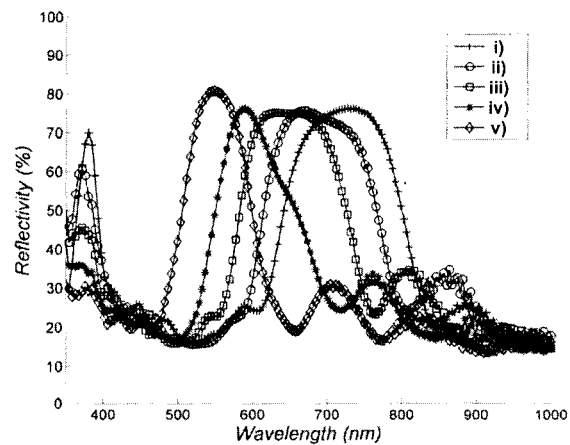
Figure 24:
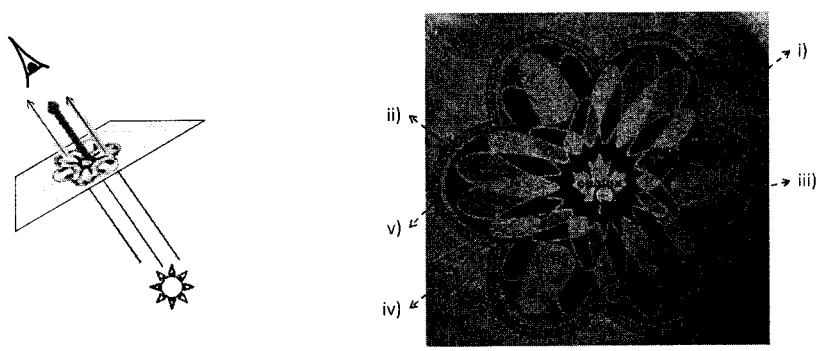
FIG. 24 illustrates the MOF film P viewed in transmission. i) Zone A—Non printed (white)—Cyan color film; ii) Zone B—Printed (Gray-1)—Blue color film; iii) Zone C—Printed (Gray-2)—Cyan-blue color film; iv) Zone D—Printed (Gray-3)—purple color film; v) Zone E—Printed (Black)—Magenta color film.
Figure 25:
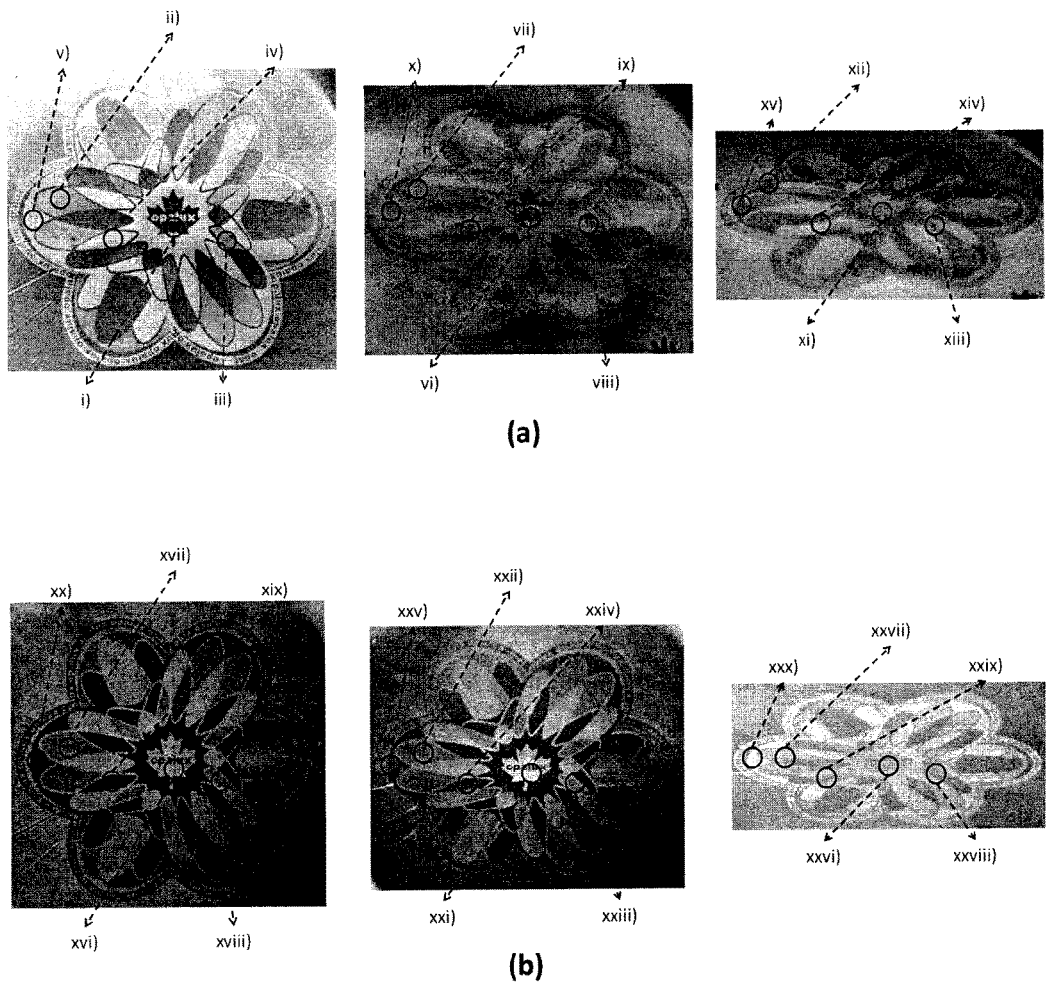
FIG. 25 illustrates the angle-dependent pictures of MOF film P in reflection (a), and transmission (b). i) Zone A—Red; ii) Zone B—Orange; iii) Zone C—Golden; iv) Zone D—Yellow; v) Zone E—Green; vi) Zone A—Orange; vii) Zone B—Yellow; viii) Zone C—Green-Yellow; ix) Zone D—Green; x) Zone E—Blue; xi) Zone A—Yellow; xii) Zone B—Blue; xiii) Zone C—Green; xiv) Zone D—Blue-Green; xv) Zone e—Violet; xvi) Zone A—Cyan; xvii) Zone B—Cyan-Blue; xviii) Zone C—Blue; xix) Zone D—Purple; xx) Zone E—Magenta; xxi) Zone A—Cyan-Blue; xxii) Zone B—Blue; xxiii) Zone C—Magenta; xxiv) Zone D—Purple-Pink; xxv) Zone E—Pink; xxvi) Zone A—Magenta; xxvii) Zone B—Purple-Pink; xxviii) Zone C—Pink; xxix) Zone D—Yellow-Pink; xxx) Zone E—Yellow.

Thermal printing of MOF film P. In a specific example, MOF film P is prepared using the same latex dispersion (Dispersion-3) and titania dispersion (Dispersion-1) as in Example™. Dispersion-1 is first coated onto a 1 mil thick polyester substrate (Mylar™ SP91 Skyrol™ polyester film from SKC Inc.) using spin-coating at appropriate rotational speed in order to achieve a dry layer thickness in the range of 80 nm-150 nm. Following drying, a layer of latex is coated onto this layer, using spin-coating, and dried to a dry layer thickness of 100 nm-300 nm. The deposition of titania and latex is carried out iteratively until the total number of layers reaches 13. Following deposition of desired number of layers, the material was coated with a clear UV-cured varnish as protective layer, which was dried to a dry layer thickness of 500 nm-1000 nm. This varnish is formulated using a urethane-acrylate polymer dispersion (Bayhydrol UV™ 2282 from Bayer MaterialScience LLC) as main component, with a photoinitiator (mixture of 1-Hydroxycyclohexyl phenyl ketone and benzophenone) and an antiblock agent (Aquacer 539 wax emulsion from BYK). After curing of the varnish layer by exposure to a UV light source at an irradiance of 5000 W/cm$^2$ (F300S UV system equipped with a D-bulb from Heraeus Noblelight Fusion UV Inc), the MOF film P was subsequently thermally patterned using a thermal printer as variable heat source (Mitsubishi P95D direct thermal printer: dot density of 1280 dots per 100 mm—print speed between 2 and 3 m/min). During the printing process, the thermal head from the printer is put into direct contact with varnish layer which acts as protective layer against abrasion forces created during the printing. The graphic printed is a grayscale image incorporating 5 different grayscale levels: white (gray level C:0 Y:0 M:0 K:0), black (gray level C:0 Y:0 M:0 K:1), gray-1 (gray level C:0 Y:0 M:0 K:0.5), gray-2 (gray level C:0 Y:0 M:0 K:0.6) and gray-3 (gray level C:0 Y:0 M:0 K:0.7) (see FIG. 23a). The same graphic was thermally printed on a standard thermal paper (K61B/KP61B supergrade thermal Paper from Mitsubishi) using the same printing device as comparison (see FIG. 23b). The reflectivity spectra corresponding to the 5 different printed grayscale levels onto thermochromic film U were recorded using an Ocean Optics USB4000 UV-Vis-NIR Fiber Optic Spectrometer (see FIG. 23c). As seen on the recorded spectra (FIG. 23c), the MOF film P is red before printing with a peak maximum of reflectivity at 740 nm (Zone A: white area in the printed graphic: K=0 for the color coordinate of black in the CYMK system). The MOF film is exposed to an increasing amount of heat when printed with different levels of gray from the lower value K to the higher value K. This results in a blue-shift of the peak maximum of reflectivity from 680 nm giving an orange color(Zone B: printed with gray level gray-1: K=0.5), to a green color with a maximum peak at 550 nm (Zone E: black printed K=1). The intermediate colors reached in between are as follows: 640 nm giving a golden color (Zone C: gray-2: K=0.6), 600 nm giving a yellow color (Zone D: gray-3: K=0.7). The MOF films may also be viewed in transmission, whereby the colors are complimentary to the reflected colors (see FIG. 24). One of the features of the disclosed MOF films is an angle-dependent coloration, such that the reflected wavelength range changes depending on the angle of the incident light with respect to the MOF surfaces. This property is intrinsic to these MOF films either before, during, or after thermal activation. Therefore thermally patterned thermochromic films have patterns with angle-dependant coloration in both reflection and transmission (see FIG. 25)

Example 11

Figure 26:
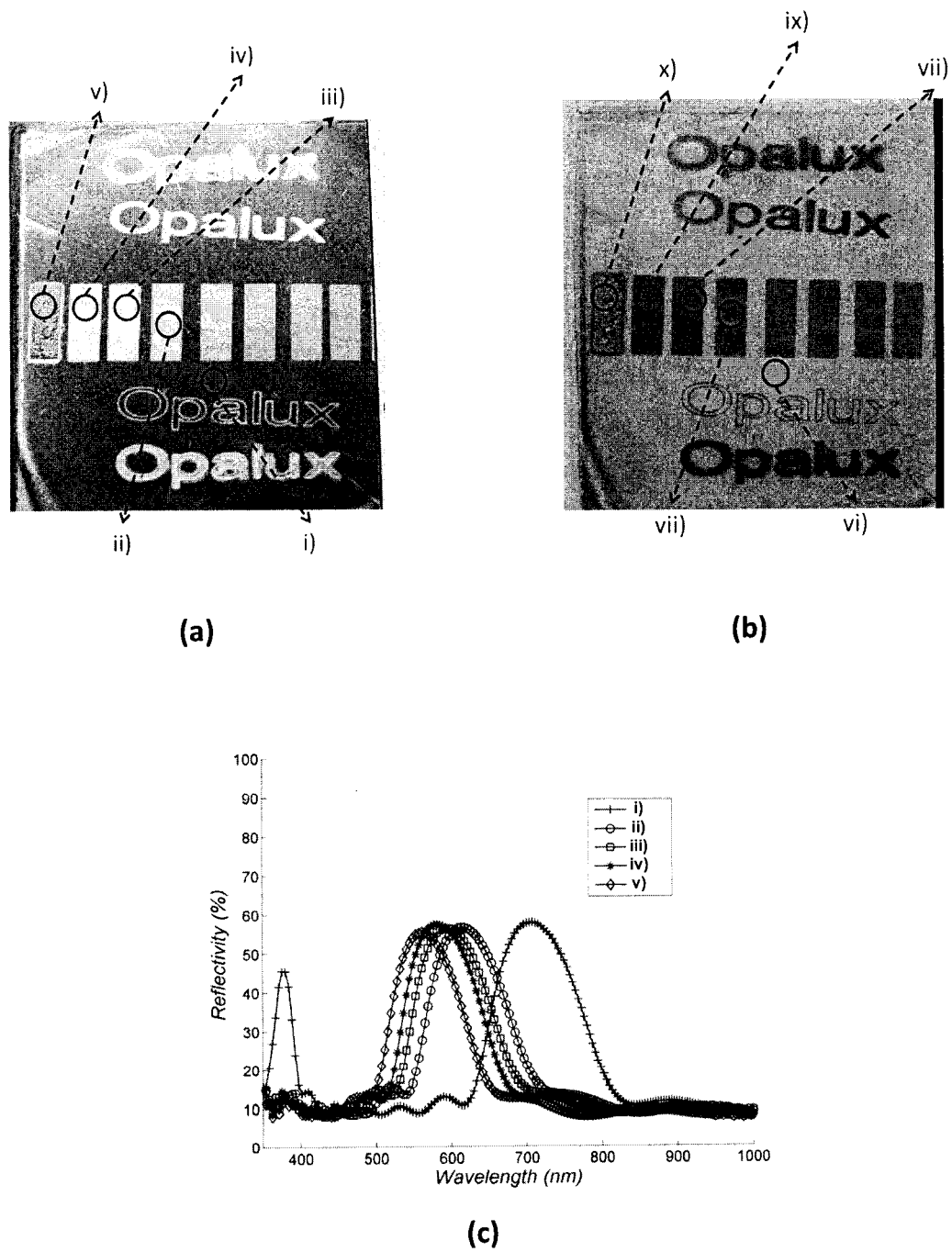
FIG. 26 illustrates a laser patterned MOF film Q viewed in reflection (a), and transmission (b), and spectra taken of different color regions (c). i) Zone A—Red; ii) Zone B—Green-Yellow; iii) Zone C—Yellow; iv) Zone D—Green-Yellow; v) Zone E—Blue-Green; vi) Zone A—Cyan; vii) Zone B—Blue; viii) Zone C—Purple; ix) Zone D—Magenta; x) Zone E—Yellow-Pink; xi) Non patterned; xii) CO2 laser—Scan speed 25 inches/second; xiii) CO2 laser—Scan speed 20 inches/second; xiv) CO2 laser—Scan speed 15 inches/second; xv) CO2 laser—Scan speed 10 inches/second.

Laser writing of MOF film Q. In a specific example, MOF film Q is prepared using the same latex dispersion (Dispersion-3) and titania dispersion (Dispersion-1) as in Example 2. Dispersion-1 is first coated onto a 1 mil thick polyester substrate (Mylar™ SP91 Skyrol™ polyester film from SKC Inc.) using spin-coating at appropriate rotational speed in order to achieve a dry layer thickness in the range of 80 nm-150 nm. Following drying, a layer of latex is coated onto this layer, using spin-coating, and dried to a dry layer thickness of 100 nm-300 nm. The deposition of titania and latex is carried out iteratively until the total number of layers reaches 9. Following deposition of desired number of layers, the material is coated with a clear UV-cured varnish as protective layer, which is dried to a dry layer thickness of 500 nm-1000 nm. This varnish is formulated using a urethane-acrylate polymer dispersion (Bayhydrol UV 2282 from Bayer MaterialScience LLC) with a photoinitiator (mixture of 1-Hydroxycyclohexyl phenyl ketone and benzophenone). After curing of the varnish layer by exposure to a UV light source at an irradiance of 5000 W/cm2 (F300S UV system equipped with a D-bulb from Heraeus Noblelight Fusion UV Inc), the MOF film Q is subsequently coated with a waterborne hot-melt adhesive formulated using a polyurethane dispersion (Dispercoll U56 from Bayer MaterialScience LLC), a photoinitiator (mixture of 1-Hydroxycyclohexyl phenyl ketone and benzophenone) and a crosslinking agent (Sartomer SR399™ pentacrylate monomer from Arkema). After drying of the hot-melt adhesive layer, the MOF film Q is laminated onto a transparent 30 MIL polycarbonate substrate using a heated roll laminator (PL 227-hp from Professional Laminating Systems) at 100 degrees Celsius and at 3 ft/min. After hot lamination of MOF film Q onto the polycarbonate substrate, the adhesive layer is UV cured using the same conditions as previously described. Using a $CO_2$ laser engraving system (North-American Lasers, max power: 25 watt, frequency: 5 kHz, wavelength:10.6 microns) the MOF film is then thermally patterned. By modulating the scan speed, the pulse frequency and/or power of the laser, patterning of multiple colors is achieved (see FIG. 26). As seen in FIG. 26c, when the power of the $CO_2$ laser is set to 4 watts, a variation of scan speed between 25 in/s and 15 in/s generates a color shift of from the red starting color (700 nm for the peak of maximum of reflectivity) to a green-blue color (550 nm) when written at the lowest speed.

Example 12

Figure 27:
FIG. 27 illustrates a direct portrait (top), and inverse portrait (bottom).
Figure 28:
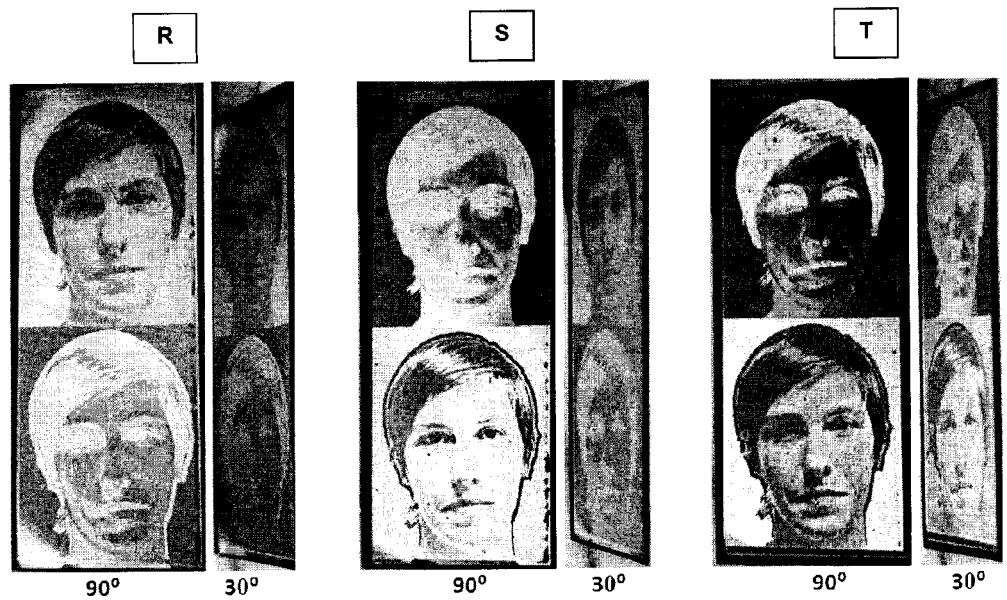
FIG. 28 illustrates pictures of portraits thermally printed on thermochromic materials R, S, and T with various starting colors observed in reflection (a) and transmission (b), both at 2 different angles (90° and 30°).
Figure 28:
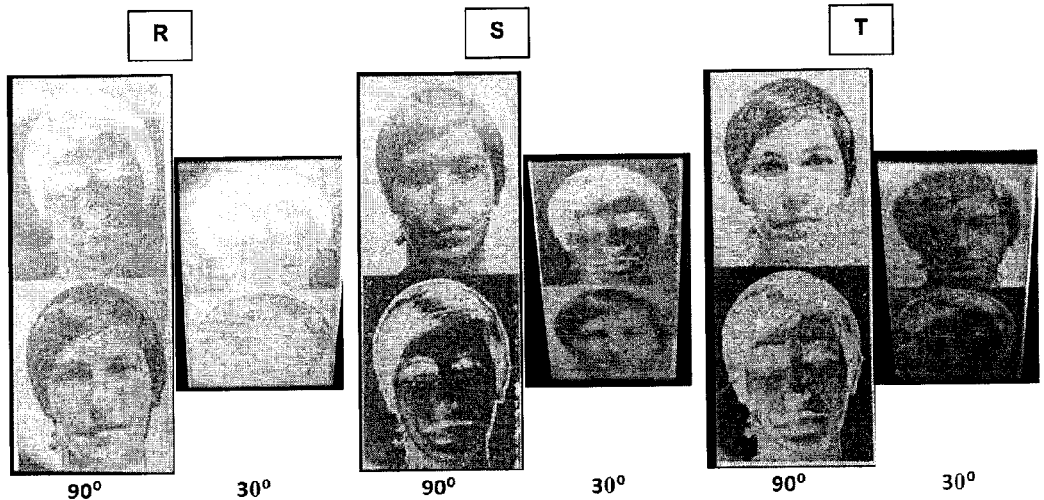
Figure 29:
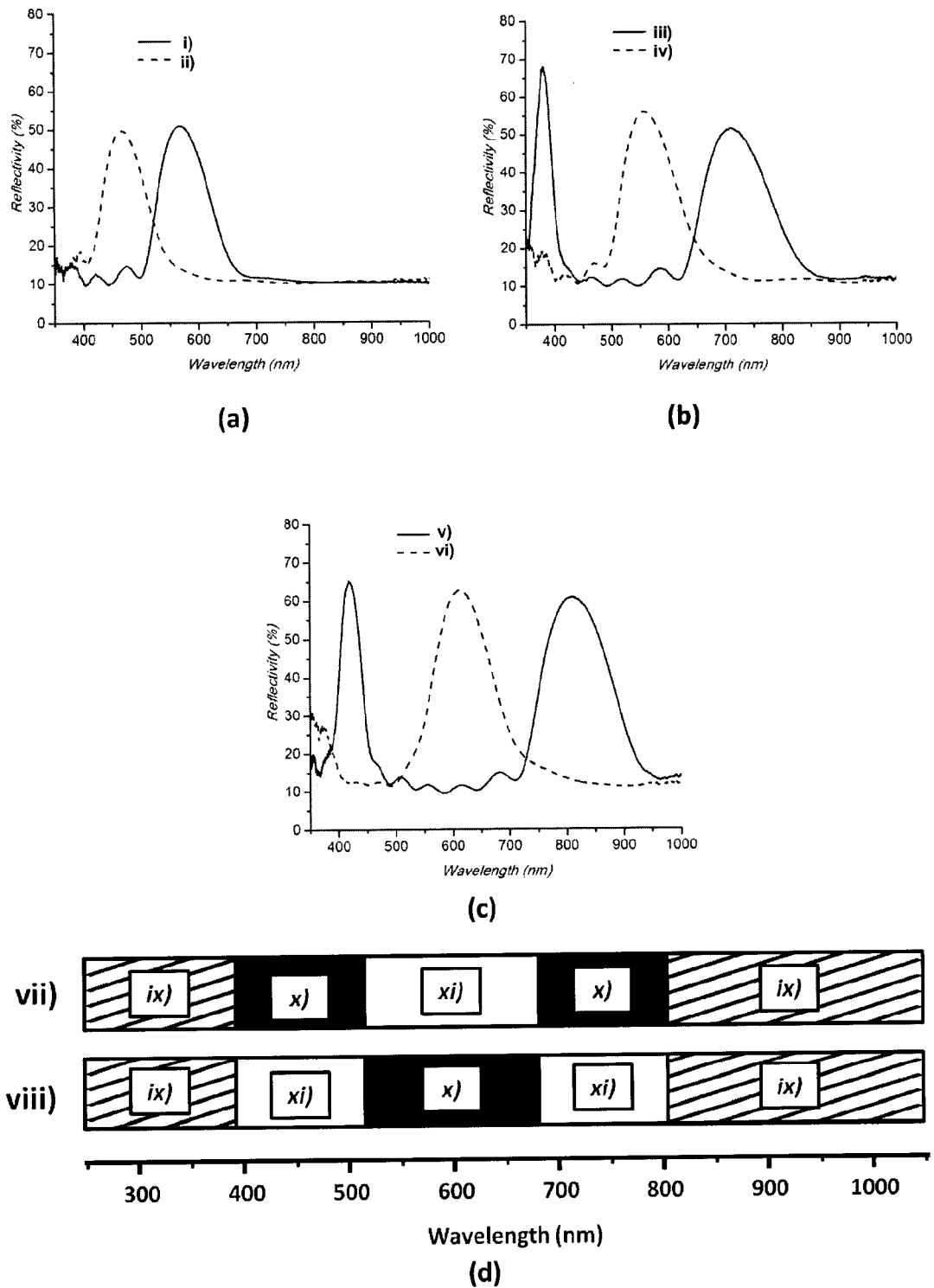
FIG. 29 illustrates reflectivity characteristics before and after printing for MOF films R (a), S (b), and T (c). i) Unprinted thermochromic film R; ii) Printed thermochromic film R; iii) Unprinted thermochromic film S; iv) Printed thermochromic film S; v) Unprinted thermochromic film T; vi) Printed thermochromic film T. Perception of color contrast of thermochromic MOF film versus wavelength (d). vii) View in Reflection; viii) View in Transmission; ix) Invisible range; x) Dark colors range; xi) Light colors range.

Printing of portraits on MOF film. In one example, 3 MOF films (R, S and T) with different starting colors were prepared following the method used in example 10 and by adequately targeting various thicknesses for both titania and latex layers. After curing of the varnish layers, the MOF films R, S and T were subsequently thermally patterned with a graphic representing a human portrait printed in both direct and inverse coloration (see FIG. 27) using the same direct thermal printer used in example 10. After printing, the patterned thermochromic films were hot laminated onto a 30 Mil (~750 microns) transparent polycarbonate substrate (see FIG. 28). As shown in FIG. 28a, the portrait thermally printed in direct greyscale appears on the MOF film either in direct coloration (e.g. for film R) or in inverse coloration (e.g. for films S and T) and reciprocally for the transmission complementary colors (as seen in FIG. 28b) depending on the starting color of the MOF film. This phenomenon is due to the human eye's perception of intensity of different colors and the way they contrast with each other. Violet, blue and red colorations are perceived as "dark colors" by the eye and yellow and cyan are perceived as light colorations, creating a contrast effect for the patterned MOF film and enabling the perception of the pattern printed on the film. Depending on the spectrometric characteristics of the MOF film, it is possible to predict the contrast rendition of a graphic once the film is thermally printed onto the MOF film as shown in FIG. 29. By adequately choosing the range on which the peak of maximum reflectivity is located before thermal activation, after thermal activation, and at any intermediate stages in between initial and final state, it is possible to control the contrast, the visibility and the rendition of the pattern printed into the MOF film. Due to the angle-dependency of the coloration, such that the reflected wavelength blue-shifts when the angle of the incident light with respect to the MOF film is decreasing, the contrast rendition could undergo an inversion during tilting of the MOF film. As seen for thermochromic film S in FIG. 28, the top portrait appears in direct coloration at normal incidence, but in inverse coloration at oblique angle, while the bottom portrait appears in inverse coloration at normal incidence, but in direct coloration at oblique angles. The effect is the opposite when viewed in transmission. Such contrast inversion happens when the peaks of maximum reflectivity are blue-shifting from a "dark" coloration range to a "light" coloration (as perceived by the human eye) for both printed and unprinted regions as the angle of viewing is decreasing. In addition, it is also possible to incorporate any coloration into the pattern by disposing the MOF film over colored substrates or backgrounds. In the case of thermochromic film R, S and T, the pictures in FIG. 28 were taken with a black background in reflection viewing mode and with a white background in transmission mode so that the regions of the films with peak of maximum reflectivity in an invisible range (UV or IR) appears black in reflection and white in transmission. One key feature of the MOF films is the possibility of creating patterns and graphics containing one or both of with visible and invisible ranges, especially useful for security applications.

Example 13

Figure 30:
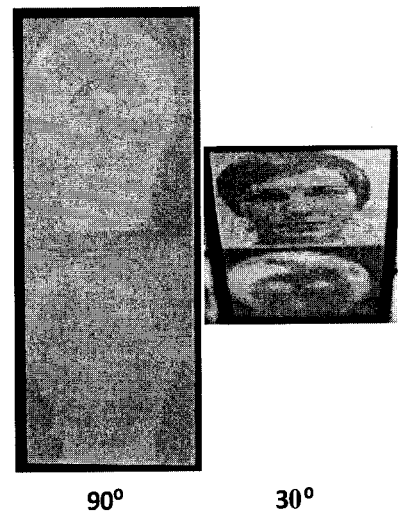
FIG. 30 illustrates portraits printed in direct and inverse contrast on MOF films U (a) and V (b) viewed at two different angles (90 and 30 degrees).
Figure 30:

Printing of portraits in MOF materials that become visible or invisible by changing viewing angle. In one example, two MOF films (U and V) with different starting colors, were prepared following the method used in example 12 and by adequately targeting various thicknesses for both titania and latex layers. The same portraits with direct and inverse contrast were printed onto both films U and V. At a specular angle the pattern printed in thermochromic film U has colorations either in invisible range or light color range and upon tilting to a viewing angle of 30 degree the printed pattern coloration shift into the dark color region (FIG. 30a). With the pattern printed on thermochromic film V we can observe a reverse phenomenon where the pattern is initially visible at 90 degree and disappears upon tilting to a 30 degree angle (FIG. 30b)

Example 14

Figure 31:
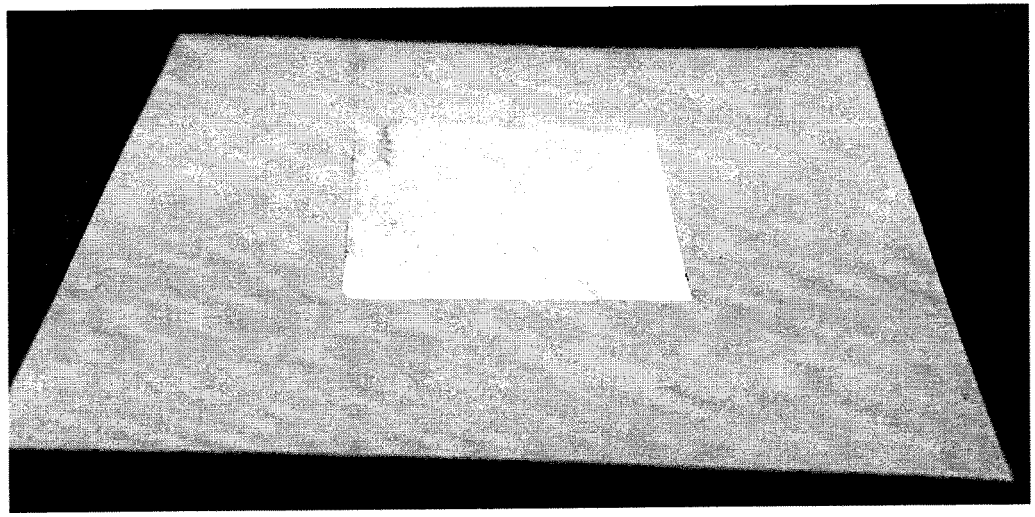
FIG. 31 illustrates a MOF laminate transferred onto cotton paper and patterned by thermal printing.
Figure 32:
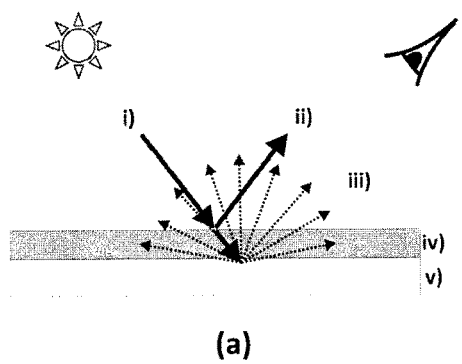
FIG. 32 illustrates optical properties of a MOF on white paper background (a). Picture of printed MOF on paper viewed in reflection (b), and at two angles in transmission (c), (d). i) White light; ii) Green light (specular); iii)
Figure 32:
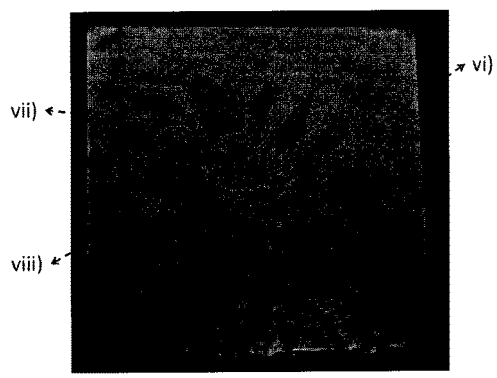
Figure 32:
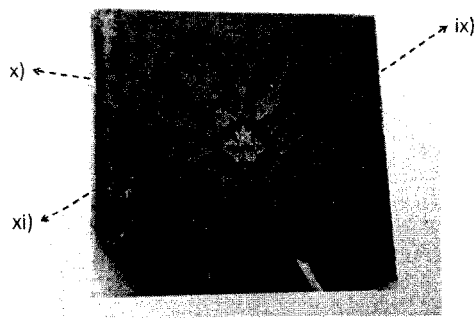
Figure 32:

Preparation of laminate incorporating MOF film. In one example, a MOF film is prepared using the same latex dispersion (Dispersion-3) and titania dispersion (Dispersion-1) as in Example 2. A clear UV-cured varnish formulated with a urethane-acrylate polymer dispersion (Bayhydrol™ UV 2282™ from Bayer MaterialScience LLC) as main component in addition to a photoinitiator (mixture of 1-Hydroxycyclohexyl phenyl ketone and benzophenone) and an anti-block agent (Aquacer 539™ wax emulsion from BYK) was first coated onto a 1 mil thick releasable polyester carrier (Hostaphan 4375™K from Mistibishi Polyester Film Inc.) using spin-coating at appropriate rotational speed in order to achieve a dry layer thickness in the range of 1000 nm-1500 nm. After drying followed by curing of the varnish layer using exposure to a UV light source at an irradiance of 5000 W/cm$^2$ (F300S UV system equipped with a D-bulb from Heraeus Noblelight Fusion UV Inc), the film was subsequently coated with Dispersion-1 using spin-coating at dry layer thickness in the range of 80 nm-150 nm. Following drying, a layer of latex is coated onto this layer, using spin-coating, and dried to a dry layer thickness of 100 nm-300 nm. The deposition of titania and latex is carried out iteratively until the total number of layers reaches 13. The MOF was subsequently coated with a waterborne hot melt adhesive formulated using a polyurethane dispersion (Dispercoll U56 from Bayer MaterialScience LLC), a photoinitiator (mixture of 1-Hydroxycyclohexyl phenyl ketone and benzophenone) and a crosslinking agent (Sartomer SR399 pentacrylate monomer from Arkema). The dry layer thickness for the adhesive is targeted in the range of 5 microns-10 microns. After drying of the adhesive layer the thermochromic film was hot transferred onto a secondary substrate (white cotton paper at 90 g/m$^2$) using a heated roll laminator (PL 227-hp from Professional Laminating Systems) at 100 degrees Celsius and at 3 ft/min. After hot lamination of the thermochromic laminate onto the paper substrate, the carrier was removed by peeling and the adhesive layer was UV cured in the same conditions as previously described. After transfer of the laminate the first coated varnish layer is now on top and protecting the MOF film laminated onto the paper substrate. The MOF film is then thermally printed using a direct thermal printer as variable heat source (Mitsubishi P95D direct thermal printer) (see FIG. 31). The opaque white paper acts as a white diffuse reflector, as illustrated in FIG. 32a. Therefore the pattern printed in the transferred MOF laminate can be observed in either specular reflection and diffuse reflection (see FIGS. 32b,c and d).

Example 15

Preparation of demonstration ID card using MOF laminate. In one example, a MOF laminate with starting color in the invisible range is prepared as in example 14. This MOF laminate is heat transferred using hot lamination (as previously described) onto an opaque ID card (CR80 size, 30 Mil thick) printed with standard ID data. Security features including a portrait (14), text (6), small text in undulating lines (8,12), a flag (2), a personalized signature (10) and guilloche patterns (4) are then thermally printed in the thermochromic laminate (FIG. 33). The security features are printed in registry with the underlying data from the ID card to ensure harmonious incorporation and easy reading of the underlying data.

Example 16

Preparation of demonstration ID card incorporating a transparent window using a thermochromic laminate. In one example, a thermochromic laminate with starting color in the invisible range is prepared as in example 14. This thermochromic laminate is heat transferred onto an ID card (CR80 size, 30 Mil thick) with a transparent window. Security features including a portrait (8), text (6), small text in undulating lines (12), a flag (2), a personalized signature (10) and guilloche patterns (4,14) are then thermally printed in the thermochromic laminate (FIG. 34). The security features are printed in registry with the underlying data from the ID card to ensure harmonious incorporation and easy reading of the underlying data. The portrait is printed in registry with the transparent window so that a color-shifting image of the portrait will be viewable in transmission (coloration of the portrait being uniquely angle-dependant).

Example 17

Preparation of demonstration passport using MOF laminates. In one example, 4 MOF laminates with various starting colors are prepared as in example 14. These 4 MOF laminates are heat transferred onto a paper passport data page as 4 different patches in registry with the underlying data from the passport page. Security features including a portrait (6), text (4), small text in undulating lines (10), a flag (2), a personalized signature (8) and guilloche patterns (12) are then thermally printed in the MOF patches (FIG. 35). The security features are printed in registry with the underlying data from the passport page to ensure harmonious incorporation and easy reading of the underlying data.

Example 18

Preparation of demonstration paper banknote using MOF laminate. In one example, a MOF laminate is prepared as in example 14. This MOF laminate is heat transferred as a stripe (2) onto a demonstration paper banknote in registry with two black patches (4) included in the banknote design. The MOF film is laminated over sections of the banknote with high contrast in the background (4,6), highlighting the unique feature of the MOF film interplaying with both specular reflection and diffuse reflection (FIG. 36). Security features including serial numbers, small texts, graphics and guilloche patterns are then thermally printed in the thermochromic thread. The security features are printed in registry with the design of the banknote to ensure harmonious incorporation.

Example 19

Preparation of demonstration polymer banknote incorporating a transparent window using MOF laminate. In one example, 2 MOF laminates are prepared as in example 14. These MOF laminates are heat transferred as a stripe (2) and a patch (4) onto a demonstration polymer banknote in registry with a transparent window in the banknote design. The MOF stripe is transferred over the transparent window allowing viewability of the MOF film from both sides of the banknote (6). Security features including serial numbers, small texts, graphics and guilloche patterns are then thermally printed in the thermochromic patch and thread (FIG. 37). The security features are printed in registry with the design of the banknote to insure harmonious incorporation, the features printed on the thread being viewable in transmission through the transparent window (6).

The embodiments and examples of the present disclosure described above are intended to be illustrative only. Alterations, modifications and variations to the disclosure may be made without departing from the intended scope of the present disclosure. In particular, selected features from one or more of the above-described embodiments and examples may be combined to create alternative embodiments not explicitly described. All values and sub-ranges within disclosed ranges are also disclosed. The subject matter described herein intends to cover and embrace all suitable changes in technology. All references mentioned are hereby incorporated herein by reference in their entirety.

The invention claimed is:

1. A tunable multilayer optical film having at least two layers, at least one layer comprising a plurality of fluidizable particles, there being interstitial void space between the particles, the at least one layer having a first refractive index and a first optical thickness, the other of the at least two layers having a second refractive index and a second optical thickness, the first refractive index being different from the second refractive index.

2. The tunable multilayer optical film according to claim 1, wherein the fluidizable particles comprise a core-shell configuration.

3. The tunable multilayer optical film according to claim 2, wherein the fluidizable particles comprise more than 20% by mass of at least one layer.

4. The tunable multilayer optical film according to claim 2, wherein the layers are between 10 nm and 1000 nm in thickness.

5. The tunable multilayer optical film according to claim 2, wherein at least 80% of the particles are less than 200 nm in diameter.

6. The tunable multilayer optical film according to claim 1, wherein coating components occupy at least a portion of the interstitial void space.

7. The tunable multilayer optical film according to claim 6, wherein the multilayer optical film has an initial set of optical properties, wherein upon an application of energy, the multilayer optical film's optical properties change to a second set of optical properties.

8. The tunable multilayer optical film according to claim 7, wherein the energy is provided in the form of thermal or radiant energy.

9. The tunable multilayer optical film according to claim 8, wherein the initial set of optical properties differs from the second set of optical properties in at least the property of optical thickness.

10. The tunable multilayer optical film according to claim 8, wherein the initial set of optical properties differs from the second set of optical properties in at least the property of geometric thickness.

11. The tunable multilayer optical film according to claim 7, wherein upon the application of energy, the interstitial void space is at least partially eliminated and/or the fluidizable particles may at least partially fuse together or consolidate.

12. The tunable multilayer optical film according to claim 11, wherein upon the application of energy, a fluid formed from the fluidizable particles infiltrates a layer other than the layer comprising those fluidizable particles.

13. The tunable multilayer optical film according to claim 7, wherein the tunable multilayer optical film is fixed so that it is no longer tunable.

14. The tunable multilayer optical film according to claim 7, wherein the interstitial void space has been partially eliminated.

15. The tunable multilayer optical film according to claim 7, wherein the tunable multilayer optical film is comprised of alternating layers.

16. The tunable multilayer optical film according to claim 7, wherein the fluidizable particles are selected from the group of salts, organic or inorganic molecular compounds, polymers, ionomers, crystals and other compounds capable of becoming fluid at a transition temperature.

17. A security device comprising a tunable multilayer optical film according to claim 1.

18. The security device according to claim 17, wherein the tunable multilayer optical film is applied to an exterior surface of the security device.

19. The security device according to claim 17, wherein the tunable multilayer optical film is encased within the security device.

20. The security device according to claim 17, wherein the tunable multilayer optical film is encased within polycarbonate.

21. The security device according to claim 17, wherein the tunable multilayer optical film is encased within a security thread.

22. The security device according to claim 17, wherein the tunable multilayer optical film is transferred onto a layer of the security device.

23. The security device according to claim 17, comprising a pattern formed by an application of energy to the multilayer optical film.

24. The security device according to claim 23, wherein the pattern comprises a serial number, portrait, signature, finger print, date or other data.

25. The security device according to claim 17, wherein the security device is used for identifying an individual.

26. The security device according to claim 17, wherein the security device is a banknote.

27. A method for fabricating a tunable multilayer optical film according to claim 1 comprising the steps of:
   a. preparing at least two dispersions for forming layers in the tunable multilayer optical film, at least one of the dispersions containing fluidizable particles;
   b. coating a first dispersion onto a substrate so that the first dispersion forms a first layer;
   c. coating a second dispersion onto the first layer to form a second layer;
   d. coating each remaining dispersion onto a previous layer, which may be the same or different; and
   e. drying and/or curing the layers, either individually, in groups and/or all together to form the tunable multilayer optical film.

28. The method according to claim 27, wherein the at least one of the dispersions containing fluidizable particles further comprises a coating component.

29. The method according to claim 28, further comprising the step of applying energy to the tunable multilayer optical film to change the optical properties of the tunable multilayer optical film.

30. The method according to claim 29, further comprising the step of applying a stimulus to the tunable multilayer optical film to fix the optical properties of the tunable multilayer optical film.

* * * * *